United States Patent

Imai et al.

[11] Patent Number: 6,148,334
[45] Date of Patent: Nov. 14, 2000

[54] SYSTEM FOR TRANSFERRING DESIRED FILE BY TRANSFERRING CONCATENATED FILE RELATED TO THE DESIRED FILE

[75] Inventors: Toru Imai, Kanagawa; Hiroko Fujii, Tokyo; Hideki Yoshida; Toshihiko Shimokawa, both of Kanagawa, all of Japan

[73] Assignee: Kabushiki Kaisha Toshiba, Kawasaki, Japan

[21] Appl. No.: 09/111,787

[22] Filed: Jul. 8, 1998

Related U.S. Application Data

[62] Division of application No. 08/745,920, Nov. 8, 1996, Pat. No. 5,987,510.

[30] Foreign Application Priority Data

Nov. 10, 1995 [JP] Japan ................................. 7-292910
Feb. 8, 1996 [JP] Japan ................................. 8-022658

[51] Int. Cl.$^7$ ........................................................ G06F 13/00
[52] U.S. Cl. ................................................................ 709/219
[58] Field of Search ............................... 709/201, 203, 709/217, 218, 219, 226, 227, 229, 246, 247

[56] References Cited

U.S. PATENT DOCUMENTS

| | | | |
|---|---|---|---|
| 5,572,643 | 11/1996 | Judson | 395/200.48 |
| 5,574,906 | 11/1996 | Morris | 707/1 |
| 5,621,892 | 4/1997 | Cook | 395/200.54 |
| 5,623,656 | 4/1997 | Lyons | 707/10 |
| 5,630,068 | 5/1997 | Vela et al. | 705/1 |
| 5,724,514 | 3/1998 | Arias | 395/200.63 |
| 5,790,708 | 8/1998 | Delean | 382/270 |
| 5,813,017 | 9/1998 | Morris | 707/204 |
| 5,835,601 | 11/1998 | Shimbo et al. | 713/165 |
| 5,923,846 | 7/1999 | Gage et al. | 709/213 |

FOREIGN PATENT DOCUMENTS

| | | |
|---|---|---|
| 6-110926 | 4/1994 | Japan . |
| 6-268678 | 9/1994 | Japan . |
| 8-87526 | 4/1996 | Japan . |
| 9-223052 | 8/1997 | Japan . |
| WO 95/32573 | 11/1995 | WIPO . |

OTHER PUBLICATIONS

M. Liljeberg, et al., International Workshop on Services in Distributed and Networked Environments, pp. 132–139, "Optimizing World–Wide Web for Weakly Connected Mobile Workstations: An Indirect Approach", Jun. 5, 1995.

V.N. Padmanabhan, et al., Computer Networks and ISDN Systems, vol. 28, pp. 25–35, "Improving HTTP Latency", 1995.

A. Luotonen et al., Computer Networks and ISDN Systems, vol. 27, pp. 147–154, "World–Wide Web Proxies", Jan. 1, 1994.

SunOS 5.5 Reference Manual, User Commands, Section 1, pp. 1–328 –1–336, Jan. 6, 1994, "FTP–File Transfer Program".

SunOS 5.5 Reference Manual, User Commands, Section 1, pp. 1–1033 –1–1038, Feb. 1, 1995, "Tar–Create Tape Archives, And Add Or Extract Files".

*Primary Examiner*—Moustafa M. Meky
*Attorney, Agent, or Firm*—Oblon, Spivak, McClelland, Maier & Neustadt, P.C.

[57] ABSTRACT

A scheme for transferring files from a file server to a file requesting client, which enables request and transfer of files which are related to a user requested file at a time of transferring a user requested file. The file requesting client makes a file request indicating a desired file, and in response the file server transfers a file list of files related to the desired file indicated by the file request. Then, the file requesting client makes a transfer request requesting a transfer of files according to the file list, and in response the file server transfers the files requested by the transfer request. Alternatively, the file requesting client makes a request indicating a desired file, and in response the file server transfers a concatenated file formed by concatenating files related to the desired file indicated by the request. Then, the file requesting client extracts individual files from the concatenated file.

26 Claims, 33 Drawing Sheets

FIG.3

```
<HTML>
<HEAD>
<TITLE>Menu</TITLE>
</HEAD>
<BODY>
<UL>
<LI><A HREF= "(URL OF FILE LIST)" >(FILE TITLE)</A>
                        ⌣                ⌣
<LI>······              1102             1101

</UL>
</BODY>
</HTML>
```

MENU 1100

FILE LIST WITH INDIVIDUAL DATA 300

VIEWER PROGRAM 400

FIG.8

```
<HTML>
<HEAD>
<TITLE>Menu</TITLE>
</HEAD>

<BODY>
<UL>
<LI><A HREF= "(URL OF FILE CONTAINING APPLET)" >
           (FILE TITLE)</A>
                                              702
                       701
<LI>······
     ¦
     ¦
     ¦
     ¦
       ·.
</UL>
</BODY>
</HTML>
```

MENU 700

FIG.9

```
<HTML>
    :
    :
<BODY>

<APP CLASS= "(APPLET NAME)"    LIST= "(FILE LIST)" >
         ‾‾‾‾‾‾‾‾‾‾‾‾‾‾‾‾‾‾‾    ‾‾‾‾‾‾‾‾‾‾‾‾‾‾‾‾‾
                  901                    902         910
```

HTML FILE CONTAINING APPLET 900

FIG.15

```
<HTML>
<HEAD>
<TITLE>Menu</TITLE>
</HEAD>
<BODY>
<UL>
<LI><A HREF= "(URL OF CONCATENATED FILE )" >(FILE TITLE)</A>
                        2002                       2001
<LI>······

</UL>
</BODY>
</HTML>
```

MENU 2000

FIG.16

```
<HTML>
    ⋮
    ⋮
<BODY>
   <PREFETCH ARCHIVE= "(URL OF CONCATENATED FILE)" >
    ⋮
    ⋮

(CONTENT OF REQUESTED FILE)
    ⋮
    ⋮
    ⋮
    ⋮

</BODY>
</HTML>
```

REQUESTED FILE 1600

FIG.18

```
<HTML>
<HEAD>
<TITLE>Menu</TITLE>
</HEAD>
<BODY>
<UL>
<LI><A HREF="(URL OF FILE CONTAINING CONCATENATED FILE
         ACQUISITION APPLET)" >
         (FILE TITLE)</A>        ~2102
<LI>......      2101

</UL>
</BODY>
</HTML>
```

MENU 2100

FIG.19

```
<HTML>
   ⋮
   ⋮
<BODY>

<APP CLASS= "(APPLET NAME)"  LIST= "(URL OF CONCATENATED
                                              FILE)" >
            2201                            2202
                                                      2210
```

HTML FILE CONTAINING APPLET 2200

FIG.20

```
<HTML>
<HEAD>
<TITLE>Menu</TITLE>
</HEAD>

<BODY>
<UL>
<LI><A HREF=  "(URL OF FILE)" > FILE TITLE</A>
      <!-- "(URL OF CONCATENATED FILE)" -->
                 1203      1202              1201
<LI>……
   |
   |
   |
   |
</BODY>
</HTML>
```

MENU 1200

VIEWER PROGRAM 1400

FIG.25

<LIST> http : //isl.rdc.toshiba.co.jp/index.html http : //isl.rdc.toshiba.co.jp/newspaper/article1.html
http : //isl.rdc.toshiba.co.jp/newspaper/article2.html
http : //isl.rdc.toshiba.co.jp/newspaper/image/image1.gif
http : //isl.rdc.toshiba.co.jp/newspaper/audio/audio1.au

FILE LIST 2500

FIG.27

```
<HTML>
   ┆
   ┆

<BODY>
   ┆
   ┆

<APP CLASS= "(PROGRAM NAME)"    LIST= "(FILE LIST)" >
  ─────   ──────────────────   ──────────────────
    1910         1901                1902
```

HTML FILE CONTAINING MULTIPLE
FILES TRANSFER PROGRAM 1900

FIG.32

CONCATENATED FILE 3200

| <CONCATENATE> ||
|---|---|
| http ://isl.rdc.toshiba.co.jp/index.html | 1024 |
| COMPRESSED FILE ||
| http ://isl.rdc.toshiba.co.jp/newspaper/article1.html | 68 |
| COMPRESSED FILE ||
| http ://isl.rdc.toshiba.co.jp/newspaper/article2.html | 350 |
| COMPRESSED FILE ||
| http ://isl.rdc.toshiba.co.jp/newspaper/image/image1.gif | 10240 |
| COMPRESSED FILE ||
| http ://isl.rdc.toshiba.co.jp/newspaper/audio/audio1.au | 5120 |
| COMPRESSED FILE ||

SYSTEM FOR TRANSFERRING DESIRED FILE BY TRANSFERRING CONCATENATED FILE RELATED TO THE DESIRED FILE

This application is a division of Ser. No. 08/745,920, filed Nov. 8, 1996, now U.S. Pat. No. 5,987,510.

BACKGROUND OF THE INVENTION

1. Field of the Invention

The present invention relates to a file transfer method, a file requesting client device, and a file server device in a system for transferring files from a file server to a file requesting client.

2. Description of the Background Art

In recent years, a system for providing a service of electronic information such as electronic newspapers and electronic publications by utilizing the WWW (World Wide Web) has been widely used. The WWW is a system which provides various files through a network from a WWW server to a WWW viewer which is a client. In the WWW, it is possible to handle files in a format called HTML (HyperText Markup Language), where it is possible to set up a hyperlink from one HTML file to another file. The message exchanges between the server and the client are carried out according to the HTTP (HyperText Transfer Protocol). By utilizing the WWW, files on the WWW servers around the world can be referred from the WWW viewer. In the recent electronic information service, there is an attempt to provide information by charging fee using this WWW.

Here, the file is used as a generic term for all the information which is formed by media such as text, figures, static images, video, audio, etc., and which can be electronically provided. One file may be formed by multiple media.

On the other hand, there is a trend among users to utilize computers in compact sizes. In addition to desktop computers, computers in portable sizes such as laptop computers, notebook computers, PDA (Personal Digital Assistance), etc. are frequently utilized. Unlike the usual desk top computer, the portable terminal is not necessarily used in a state of being connected to a network all the times, and is rather frequently used by being connected to a network according to the need.

In a case of obtaining information by utilizing the WWW from such a computer, it is necessary to keep the portable terminal in a state of being connected to a network until the utilization of the WWW is finished. However, in a case where the portable terminal is connected to a network via a modem, for example, it is desirable to download as much information as possible into the portable terminal first and to view the information content later on after the connection is disconnected.

Also, in future, it is expected that an information server will be placed on a street corner so as to realize a situation in which many people can utilize it to download desired files at desired times into the portable terminal owned by each user for some charge or for free. In such a situation, it is also necessary to make it possible to download the necessary files first, and to view the files later on at places distanced from the information server.

Consequently, for the portable terminal in particular, at a time of obtaining a desired document by connecting the terminal to the network, it is necessary to provide a function which enables references to files similarly as in a case of accessing to the WWW server even in a state where the terminal is disconnected from a network, by downloading not just the desired file but also those files which are likely to be necessary later on into the terminal in advance. This is also an effective scheme for the desk top computer as well, because by downloading files in advance, it becomes possible to display files immediately when a user needs the files.

To this end, it is possible to consider a scheme in which a user explicitly requests necessary files to the server at a time of connecting a computer to a network and downloading a certain file from the server, whenever it is possible to specify the other files which are likely to be necessary later on.

However, when there are many necessary files, it would be necessary for a user to carry out tedious processing. For instance, in a case of electronic newspapers, it is not rare for the newspaper of each day to comprise over one hundred files, and in such a case, it would be necessary for a user to make accesses over one hundred times in order to download all these files.

Thus, in a conventional system for transferring files between the file server and the file requesting client, at a time of downloading a desired file, it has been difficult for the file requesting client or a user using the file requesting client to conveniently specify files related to that desired file which are also to be downloaded.

To sum up the above, in the WWW, a transfer of files from a server to a client is basically carried out file by file. Namely, when a user requests a display of a file such as a document, the WWW client communicates with the WWW server to carry out a transfer of the requested file, and displays the transferred file on a screen. In a case of displaying another file, the same operation is to be repeated again.

However, in a case where the client computer is a computer such as a portable terminal which is not necessarily used under an environment in which it is always possible to connect the terminal to a network, the above scheme is insufficient. In order to provide necessary files to a user immediately in response to a request from a user, it is necessary to transfer multiple files collectively from the server to the client while the client computer is connected with the network, and store the transferred files at the client side.

SUMMARY OF THE INVENTION

It is therefore an object of the present invention to provide a file transfer method, a file server device, and a file requesting client device in a system for transferring files from a file server to a file requesting client, for enabling request and transfer of files which are related to a user requested file at a time of transferring a user requested file.

It is another object of the present invention to provide a file transfer method, a file server device, and a file requesting client device, capable of efficiently limiting a number of transferred files when a file transfer is not fast enough, or when an available storage medium capacity provided in a client is insufficient, or else when a file display and execution capability of a client is limited, in which already transferred filed can be utilized at a client side even when a file transfer is interrupted in order to limit a number of transferred files.

According to one aspect of the present invention there is provided a method for transferring files from a file server to a file requesting client, comprising the steps of: (a) making a file request indicating a desired file, from the file requesting client to the file server; (b) transferring a file list of files related to the desired file indicated by the file request, from the file server to the file requesting client; (c) making a transfer request requesting a transfer of files according to the file list, from the file requesting client to the file server; and (d) transferring the files requested by the transfer request, from the file server to the file requesting client.

According to another aspect of the present invention there is provided a file server device for providing files according to requests from a client, comprising: a storage medium for storing files that can be provided by the file server device and a file list of files related to each stored file; receiving means for receiving a file request indicating a desired file and a transfer request requesting a transfer of files from the client; and transmitting means for transmitting to the client the file list corresponding to the desired file indicated by the file request when the receiving means receives the file request, and the files requested by the transfer request when the receiving means receives the transfer request.

According to another aspect of the present invention there is provided a file requesting client device for receiving files provided by a file server, comprising: file request means for making a file request indicating a desired file, to the file server; receiving means for receiving an information transmitted from the file server in response to the file request; and transfer request means for making a transfer request for requesting a transfer of files according to a file list of files related to the desired file indicated by the file request, to the file server, when the information received by the receiving means is the file list.

According to another aspect of the present invention there is provided an article of manufacture, comprising: a computer usable medium having computer readable program code means embodied therein for causing a computer to function as a file server for providing files according to requests from a client, the computer readable program code means including: first computer readable program code means for causing said computer to receive a file request indicating a desired file and a transfer request requesting a transfer of files from the client; and second computer readable program code means for causing said computer to transmit to the client a file list of files related to the desired file indicated by the file request when the first computer readable program code means receives the file request, and the files requested by the transfer request when the first computer readable program code means receives the transfer request.

According to another aspect of the present invention there is provided an article of manufacture, comprising: a computer usable medium having computer readable program code means embodied therein for causing a computer to function as a file requesting client for receiving files provided by a file server, the computer readable program code means including: first computer readable program code means for causing said computer to make a file request indicating a desired file, to the file server; second computer readable program code means for causing said computer to receive an information transmitted from the file server in response to the file request; and third computer readable program code means for causing said computer to make a transfer request for requesting a transfer of files according to a file list of files related to the desired file indicated by the file request, to the file server, when the information received by the second computer readable program code means is the file list.

According to another aspect of the present invention there is provided a method for transferring files from a file server to a file requesting client, comprising the steps of: (a) making a request indicating a desired file, from the file requesting client to the file server; (b) transferring a concatenated file formed by concatenating files related to the desired file indicated by the request, from the file server to the file requesting client; and (c) extracting individual files from the concatenated file at the file requesting client.

According to another aspect of the present invention there is provided a file server device for providing files according to requests from a client, comprising: a storage medium for storing files that can be provided by the file server device, and a concatenated file formed by concatenating files related to each stored file; receiving means for receiving a request indicating a desired file from the client; and transmitting means for transmitting to the client the concatenated file corresponding to the desired file indicated by the request and a program for extracting individual files from the concatenated file.

According to another aspect of the present invention there is provided a file requesting client device for receiving files provided by a file server, comprising: request means for making a request indicating a desired file to the file server; receiving means for receiving an information transmitted from the file server in response to the file request; and extracting means for extracting individual files from a concatenated file formed by concatenating files related to the desired file indicated by the request, when the information received by the receiving means is the concatenated file.

According to another aspect of the present invention there is provided an article of manufacture, comprising: a computer usable medium having computer readable program code means embodied therein for causing a computer to function as a file server for providing files according to requests from a client, the computer readable program code means including: first computer readable program code means for causing said computer to receive a request indicating a desired file from the client; and second computer readable program code means for causing said computer to transmit to the client a concatenated file formed by concatenating files related to the desired file indicated by the request and a program for extracting individual files from the concatenated file.

According to another aspect of the present invention there is provided an article of manufacture, comprising: a computer usable medium having computer readable program code means embodied therein for causing a computer to function as a file requesting client for receiving files provided by a file server, the computer readable program code means including: first computer readable program code means for causing said computer to make a request indicating a desired file to the file server; second computer readable program code means for causing said computer to receive an information transmitted from the file server in response to the file request; and third computer readable program code means for causing said computer to extract individual files from a concatenated file formed by concatenating files related to the desired file indicated by the request, when the information received by the second computer readable program code means is the concatenated file.

Other features and advantages of the present invention will become apparent from the following description taken in conjunction with the accompanying drawings.

BRIEF DESCRIPTION OF THE DRAWINGS

FIG. 3 is an illustration of an exemplary description of a menu that can be used in the first embodiment of the present invention.

FIG. 8 is an illustration of another exemplary description of a menu that can be used in the first embodiment of the present invention.

FIG. 9 is an illustration of an exemplary HTML file containing an applet that can be used in the first embodiment of the present invention.

FIG. 15 is an illustration of an exemplary description of a menu that can be used in the second embodiment of the present invention.

FIG. 16 is an illustration of an example of a requested file that can be used in the second embodiment of the present invention.

FIG. 18 is an illustration of another exemplary description of a menu that can be used in the second embodiment of the present invention.

FIG. 19 is an illustration of an exemplary HTML file containing an applet that can be used in the second embodiment of the present invention.

FIG. 20 is an illustration of still another exemplary description of a menu that can be used in the second embodiment of the present invention.

FIG. 25 is an illustration of an example of a file list that can be used in the third embodiment of the present invention.

FIG. 27 is an illustration of an exemplary HTML file containing a multiple files transfer program that can be used in the third embodiment of the present invention.

FIG. 32 is an illustration of an example of a concatenated file that can be used in the fourth embodiment of the present invention.

DETAILED DESCRIPTION OF THE PREFERRED EMBODIMENTS

Referring now to FIG. 1 to FIG. 13, the first embodiment of a file transfer method, a file server device, and a file requesting client device according to the present invention will be described in detail.

Figure 1:
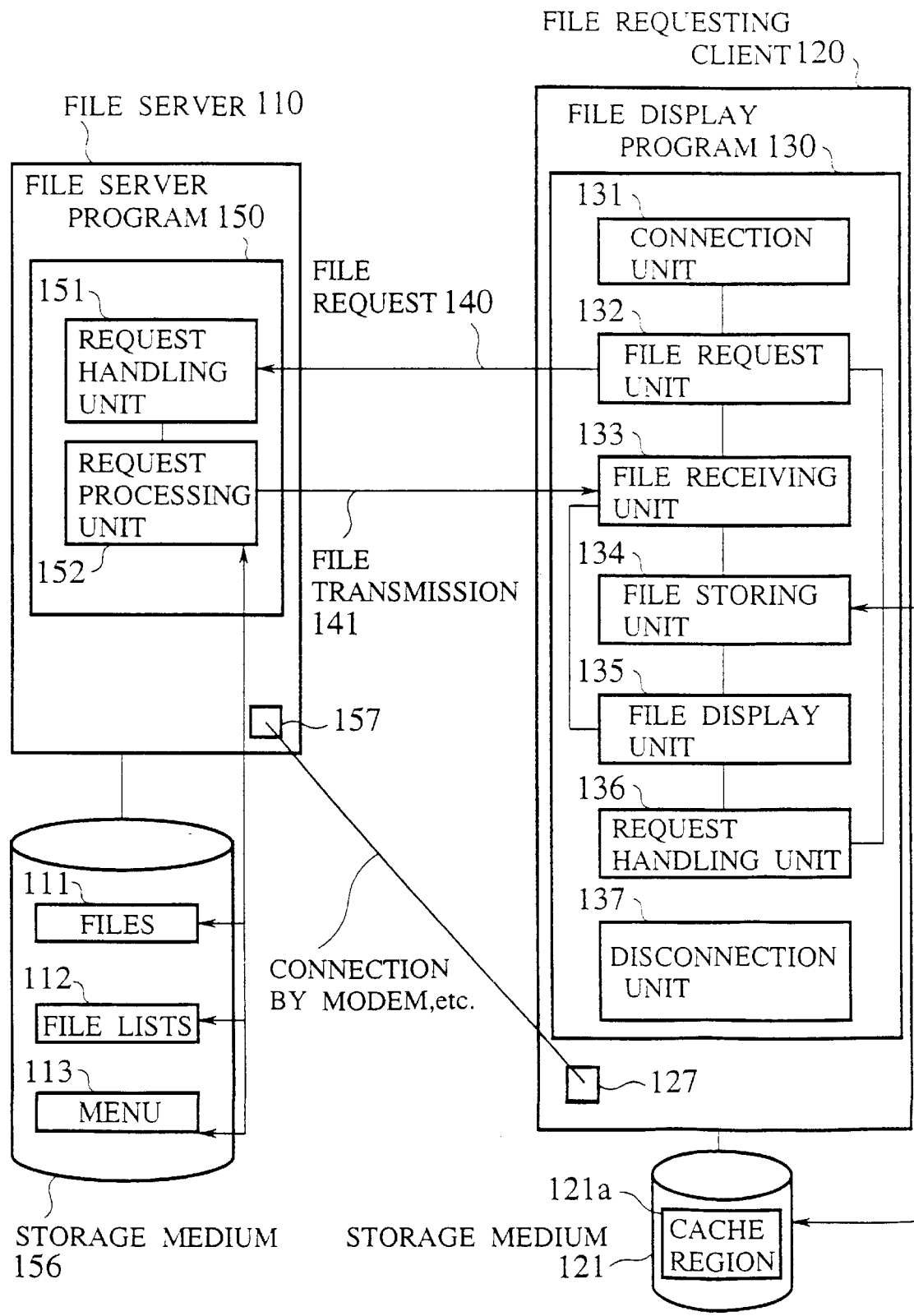
FIG. 1 is a block diagram of an information communication system for realizing the file transfer method according to the present invention.

In this first embodiment, an information communication system has a configuration as shown in FIG. 1, which generally comprises a file server 110 and a file requesting client 120, where the file requesting client 120 receives files provided by the file server 110 by means of message exchanges between the file server 110 and the file requesting client 120.

The file requesting server 120 is connected with the file server 110 by means of communication devices 127 and 157 in forms of modems, LAN, infrared interfaces, etc.

This information communication system of FIG. 1 can be used in such a manner, for example, that the file server 110 is placed at a street corner or inside an office as an electronic information service server for providing electronic newspapers, electronic publications, internal documents, etc., and files provided by the file server 110 are received by connecting the file requesting client 120 to the file server 110, where the file requesting client 110 is given in a form of a compact size portable terminal such as PC or PDA.

The file server 110 includes a request handling unit 151 for handling requests from the file requesting client 120, and a request processing unit 152 for carrying out processing according to the requests handled by the request handling unit 151. In this first embodiment, the file server 110 executes a file server program 150 which is programmed to contain functions of the request handling unit 151 and the request processing unit 152.

To this file server 110, a storage medium 156 is connected, and this storage medium 156 stores files 111 that can be provided by the file server 110, file lists 112 registering information on other related files of each file, and a menu 113 which is a list of files that can be provided by the file server 110.

The file requesting client 120 includes a connection unit 131 for setting up a connection with the file server 110, a file request unit 132 for requesting a file to the file server 110, a file receiving unit 133 for receiving a file requested from the file request unit 132, a file storing unit 134 for storing a file received by the file receiving unit 133 into a storage medium, a file display unit 135 for displaying a file requested by a user, a request handling unit 136 for handling requests from the user, and a disconnection unit 137 for carrying out a processing to finish a communication with the file server 110 and disconnect a network connection. In this first embodiment, the file requesting client 120 executes a file display program 130 which is programmed to contain functions of the connection unit 131, the file request unit 132, the file receiving unit 133, the file storing unit 134, the file display unit 135, the request handling unit 136 and the disconnection unit 137. It is also possible to implement the connection unit 131 and the disconnection unit 137 of the file requesting client 120 as a separate program independently from the file display program 130.

The file requesting client 120 is connected with a storage medium 121 having a cache region 121a in order to store the files 111 received from the file server 110.

In this first embodiment, it is assumed that the file server program 150 of the file server 110 is given by a WWW server program, and the file display program 130 of the file requesting server 120 is given by a WWW viewer program.

The operations of the file server 110 and the file requesting client 120 in this system of FIG. 1 are as follows.

In the file requesting client 120, the connection unit 131 carries out a processing for enabling the communication by HTTP with the file server 110 which is connected at the communication device 127 such as a modem or an infrared interface. Then, a menu transmitted from the file server 110 in response to a menu request from the file requesting client 120 is received at the file receiving unit 133. When a file is selected from the menu by the user and a user's request is entered, this request is handled at the request handling unit 136. The file request unit 132 then transmits a file request 140 according to this handled request.

When a file transmission 141 corresponding to the file request 140 transmitted from the file request unit 132 is received from the file server 110, the transmitted file is received at the file receiving unit 133. When an information received at the file receiving unit 133 is a file list, the file requesting client 120 further requests files listed in that file list from the file request unit 132. When a file corresponding to the file request 140 from the file request unit 132 is transmitted from the file server 110, this file is received at the file receiving unit 133. This received file is then stored into the cache region 121a of the storage medium 121 by the file storing unit 134. In addition, when an information received at the file receiving unit 133 is a file requested by the user, this file is displayed by the file display unit 135.

In a case where the file requesting client 120 wishes to disconnect the connection with the currently connected file server 110, the processing by the disconnection unit 137 is carried out. Here, the user of the file requesting client 120 is capable of carrying out the disconnection processing by the disconnection unit 137 at any desired timing. When the user requested the disconnection, if the transmission of the file from the file server 110 is already completed, the processing for the disconnection is carried out immediately. If it is in a middle of the file transmission, the disconnection processing is carried out after the abort processing. Note that, for the processing at the disconnection unit 137 in a case of a disconnection request in a middle of the file transmission, it is also possible to use a processing in which the execution of the abort processing is delayed until the completion of the file transmission, or a processing in which the fact that it is in a middle of the file transmission is notified to the user and whether the user wishes to abort the file transmission or not is checked.

On the other hand, in the file server 110, the request handling unit 151 handles the file request 140 transmitted from the file request unit 132 of the file requesting client 120. Then, the request processing unit 152 searches a file list for the requested file corresponding to the file request 140 from the file lists 112, and transmits the searched file list to the file requesting client 120 by the file transmission 141.

Figure 2:
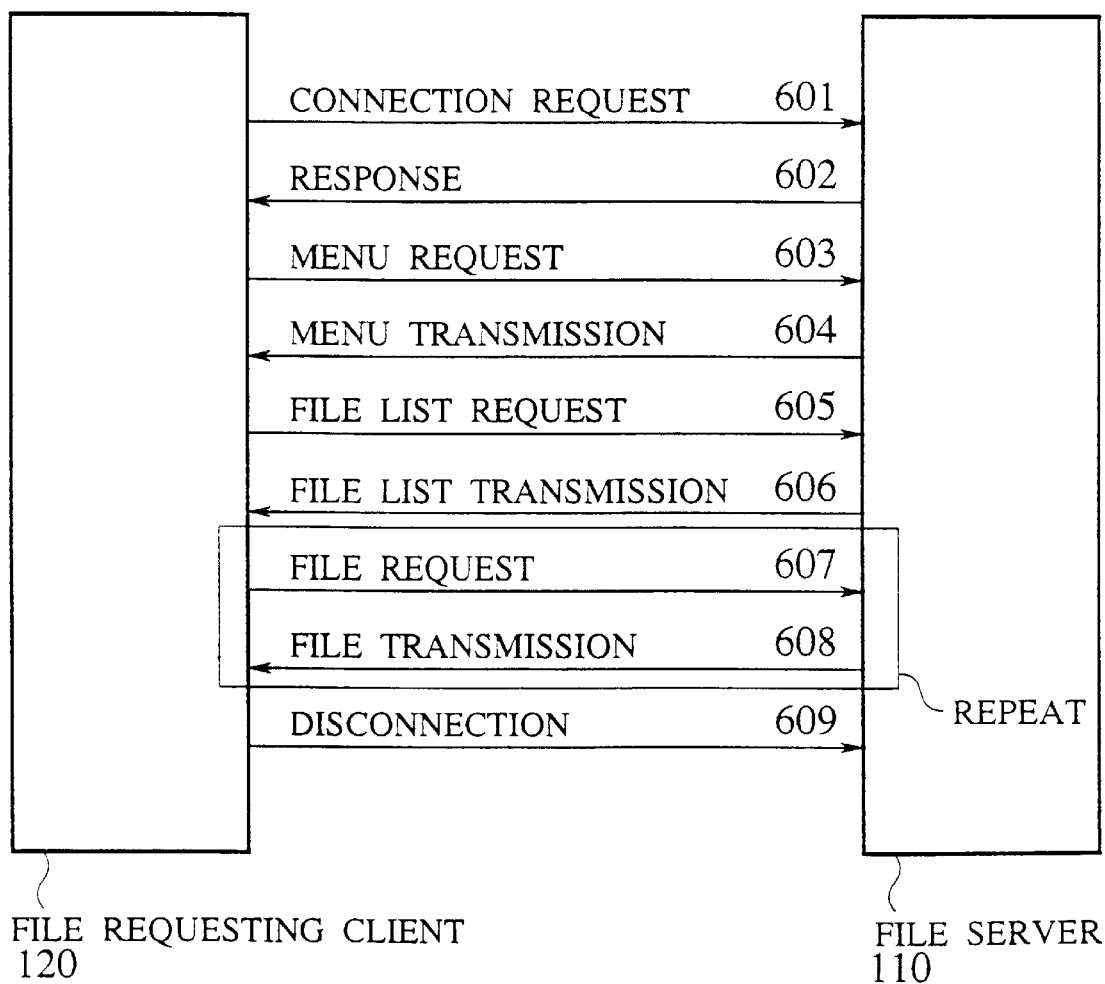
FIG. 2 is a sequence chart for an exemplary file transfer procedure in the first embodiment of the present invention.

FIG. 2 shows an exemplary file transfer procedure in this first embodiment in terms of communications between the file server 110 and the file requesting client 120. In this FIG. 2, it is assumed that the HTTP is used as the file transmission protocol.

When the user wishes to receive a desired file, the user first connects the file requesting client 120 to an appropriate file server 110 by using the communication device 127 such as a modem or an infrared interface. Then, in order to carry out the processing necessary in creating a state in which communications by the HTTP between the file server 110 and the file requesting client 120 are possible, a connection request 601 is sent from the file requesting client 120 to the file server 110. At the file server 110 side, when the connection request 601 from the file requesting client 120 is received, a response 602 is returned after a necessary processing is carried out. Here, the processings for the connection request 601 and the response 602 can be carried out by utilizing the PPP (Point-to-Point Protocol) or the DHCP (Dynamic Host Configuration Protocol), for example.

After the connection processing between the file server 110 and the file requesting client 120 is completed, the file requesting client 120 is now connected with the file server 110 by the HTTP, and a menu which is a list of files that can be provided by the file server 110 is requested by a menu request 603. In response to the menu request 603, the file server 110 transmits a menu to the file requesting client 120 by a menu transmission 604. Here, the menu is given as home pages available at the file server 110 or pages that can be reached by tracing links from these home pages. When the user selects a desired file from the menu, and a file list request 605 for the selected file is sent to the file server 110. At the file server 110, when the file list request 605 from the file requesting client 120 is received, the file list corresponding to the selected file is sent to the file requesting client 120 by a file list transmission 606.

Then, at the file requesting client 120, the transmission of files is requested to the file server 110 by a file request 607, according to the description of the file list sent from the file server 110 by the file list transmission 606. Here, the file requesting client 120 has a function to interpret the file list and sequentially request the transmission of each file listed in the file list. When the file request 607 from the file requesting client 120 is received, the file server 110 sends the requested file by a file transmission 608.

In this procedure of FIG. 2, steps of the file list request 605 to the file transmission 608 basically constitute a processing with respect to a single file request. Among then, the steps of the file request 607 and the file transmission 608 are to be repeated for as many times as necessary according to the description of the file list.

When all the necessary files are received and the user wishes to disconnect the connection with the file server 110, a disconnection request 609 is sent from the file requesting client 120 to the file server 110. Here, when the disconnection request 609 is entered by the user, the file requesting client 120 checks whether the receiving of all the necessary files has been completed or not, and if it has been completed, the disconnection request 609 is sent to the file server 110.

On the other hand, if the file server 110 is still in a middle of the transmission of necessary files, an abort processing is carried out, and the disconnection request 609 is sent after the abort processing is completed. The abort processing can be initiated from either one of the file server 110 and the file requesting client 120. When the abort is issued, the file requesting client 120 stores only those files whose receiving has already been completed, and those files which are in a middle of receiving are deleted. Else, it is also possible to delete all the files that are received in response to the request for which the abort is issued. Alternatively, if the receiving of all necessary files has not been completed when the disconnection request 609 is entered by the user, instead of carrying out the abort processing, it is also possible to wait for the completion of the receiving of all necessary files and send the disconnection request 609 to the file server 110 after the completion of the receiving of all necessary files. Else, it is also possible to allow the user to select the processing in a case of the disconnection request in a middle of the file transmission.

Even in a case of storing the file lists and the files in the file server 110 as in this first embodiment, there can be cases in which the file server 110 receives accesses not just from the file requesting client 120 of a type described in this first embodiment but also from the file requesting client of a conventional type. For example, it is possible for the viewer on a computer which is utilized in a state of being always connected to the network to request a file to the file server 110 just as in a conventional case. Even in such a case, the file server 110 of this first embodiment is capable of providing the requested file alone to the viewer. Also, the file server 110 of this first embodiment can be realized by newly providing the file lists (or the file lists and an applet for carrying out the file request) in the file server of a conventional type. Consequently, it is possible to realize the transfer of related files without affecting files which are already managed at the file server of a conventional type.

FIG. 3 shows an exemplary description of the menu which is a list of files that can be provided and which is stored in the storage medium 156 of the file server 110. This menu is for the user to select a desired file, and given as home pages available at the file server 110 or pages that can be referred by tracing links from these home pages, for example.

The menu 1100 shown in FIG. 3 is described in the HTML format, in which a file title 1101 of a file that can be provided by this file server 110 and a URL (Uniform Resource Locater) 1102 of a file list corresponding to that file are linked.

When the user requests a file corresponding to the file title 1101 in the menu 1100 of FIG. 3, the file list described by the URL 1102 is actually transferred from the file server 110 to the file requesting client 120. At this point, the file list at least describes URLs of the file requested by the user and its related files. The file requesting client 120 acquires the files described in that file list by requesting them to the file server 110. It is also possible to describe the URL of the requested file in the 1102 portion of the menu 1100 while describing the URL of the file list within that file in a form of being enclosed by a special tag. In such a case, when the user requests the file, that file is transferred to and displayed at the file requesting client 120. Then, at the file requesting client 120, the URL of the file list which is enclosed by the special tag is retrieved from that file, and that file list is requested to the file server 110. The file list in this case may not contain the URL of the requested file.

Figure 4:
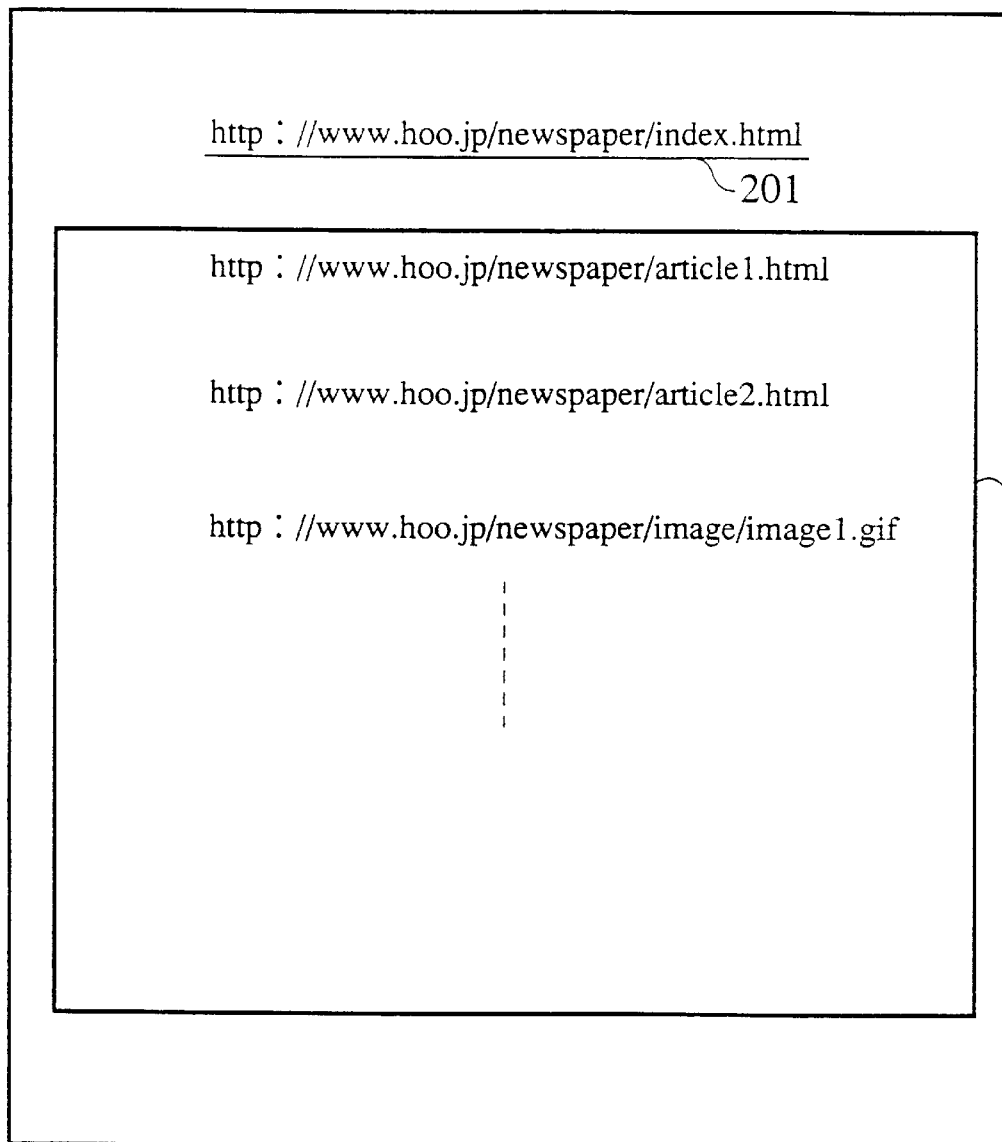
FIG. 4 is an illustration of one example of a file list that can be used in the first embodiment of the present invention.

FIG. 4 shows an example of the file list stored in the storage medium 156 of the file server 110. In this file list 200 of FIG. 4, descriptions indicating locations of the file requested by the user and its related files are described in a form of being separated by prescribed separators. In the file list 200 of FIG. 4, the URL 201 corresponding to the file requested to the file server 110 by the user and the URLs 202 of the files related to the requested file are described. FIG. 4 shows an exemplary case in which a line feed code is used as a separator in the file list, and the file described at a top of the file list is the file requested by the user.

The file list may be produced by a file provider, or produced automatically by extracting link information from the requested file. In a case of automatically producing the file list, a program for automatically producing the file list is stored in the file server 110 in advance. In this program, the information on all URLs that can be referred from the requested file and files that can be traced from the requested file by links is extracted. At this point, it should be allowed to set up in advance a depth of links to be traced from the requested file.

Note that it is also possible for the description of the file list to contain another file list. In such a case, the files described in that another file list will also be requested to the file server 110.

Figure 5:
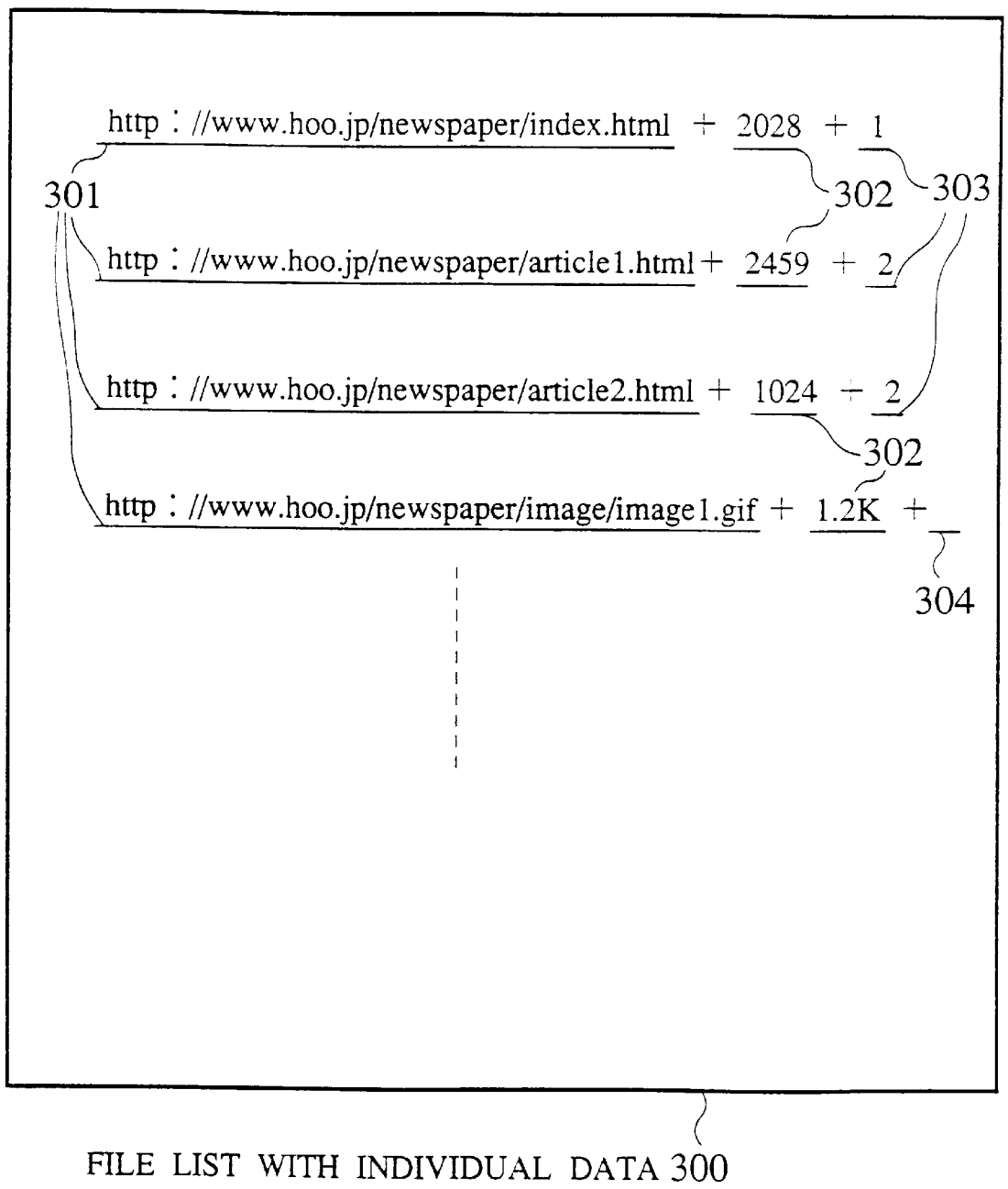
FIG. 5 is an illustration of another example of a file list that can be used in the first embodiment of the present invention.

FIG. 5 shows another example of the file list. The file list 300 shown in FIG. 5 describes individual data of each listed file in addition to the content as described in the file list 200 shown in FIG. 4. Here, the individual data are described behind the URL of each file, in a form of being separated by prescribed separators which are distinct from the separators used in the file list 200 of FIG. 4. For the individual data of each file can include a file size, a priority level, etc. In an example shown in FIG. 5, behind the URL 301 which indicates a location of each file, the corresponding individual data are described using + (plus symbol) as a separator. A column 302 next to the URL 301 indicates the corresponding file size, and the last column 303 indicates the corresponding priority level. It is also possible to define the default size and the default priority level and set these default values to the individual data so that the description of the individual data can be omitted as in a portion 304.

Figure 6:
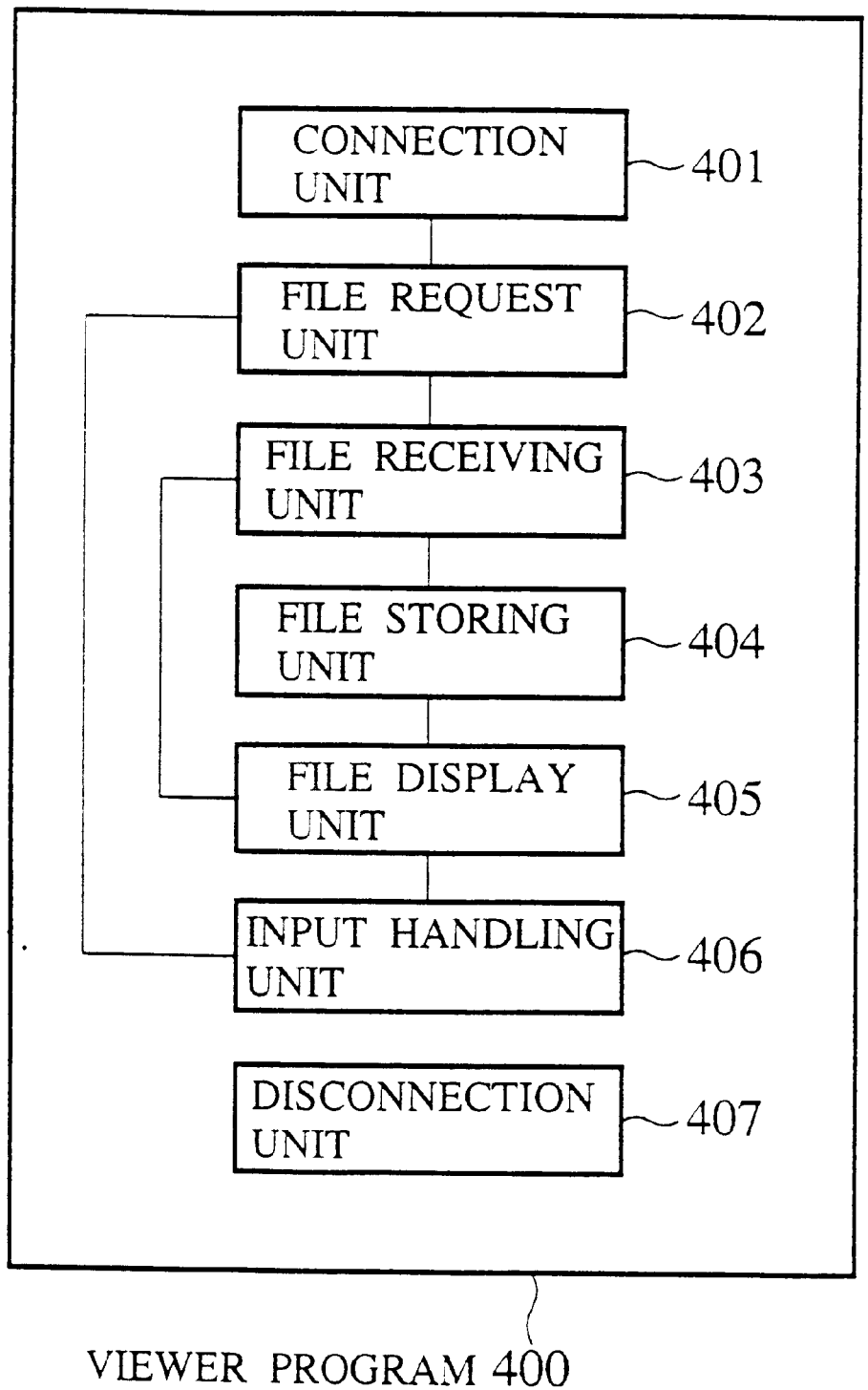
FIG. 6 is a block diagram of an exemplary viewer program that can be used in the first embodiment of the present invention.

FIG. 6 shows an exemplary viewer program to be used as the file display program 130 in the file requesting client 120. In FIG. 6, the viewer program 400 comprises a connection unit 401, a file request unit 402, a file receiving unit 403, a file storing unit 404, a file display unit 405, an input handling unit 406, and a disconnection unit 407.

In this viewer program 400, the connection unit 401 carries out the processing necessary in creating a state for enabling communications by the HTTP between this file requesting client 120 and the file server 110 which is connected with this file requesting client 120 via modems or infrared interfaces, and after the processing by the connection unit 401 is finished, the transmission of the menu is requested to the file server 110 at the file request unit 402.

The menu transmitted from the file server 110 in response to the request from the file request unit 402 is received at the file receiving unit 403, and displayed at the file display unit 405.

A request for the file selected by the user from the menu displayed by the file display unit 405 is handled at the input handling unit 406. Then, the file list for the file corresponding to the request handled at the input handling unit 406 is requested from the file request unit 402, and the file list requested by the file request unit 402 is received at the file receiving unit 404.

Then, according to the content of the received file list, a file is requested from the file request unit 402, and the file requested by the file request unit 402 is received at the file receiving unit 403 and the received file is stored into the cache region 121a of the storage medium 121 by the file storing unit 404.

In addition, the file corresponding to the user's request is displayed on a viewer by the file display unit 405. The operations of the file request unit 402, the file receiving unit 403, and the file storing unit 404 according to the file list are repeated as many times as a number of files listed in the file list. Also, when the user wishes to carry out the disconnection, the disconnection processing is carried out by the disconnection unit 407.

According to the file transfer method in this first embodiment, the related files of the file requested by the user are also to be stored in the file requesting client 120 owned by the user in addition to the file requested by the user, so that depending on a number of related files or their sizes, there can be cases in which the cache region 121a of the storage medium 121 of the file requesting client 120 turns out to be insufficient to store all these files. In such a case, if the file size and the priority level for storing into the file requesting client 120 are attached to each file listed in the file list, it is possible to selectively store only those files that can be stored into a vacant region of the cache region 121a. In addition, when there is a file that cannot be stored into the cache region 121a, this fact may be notified to the user.

Figure 7:
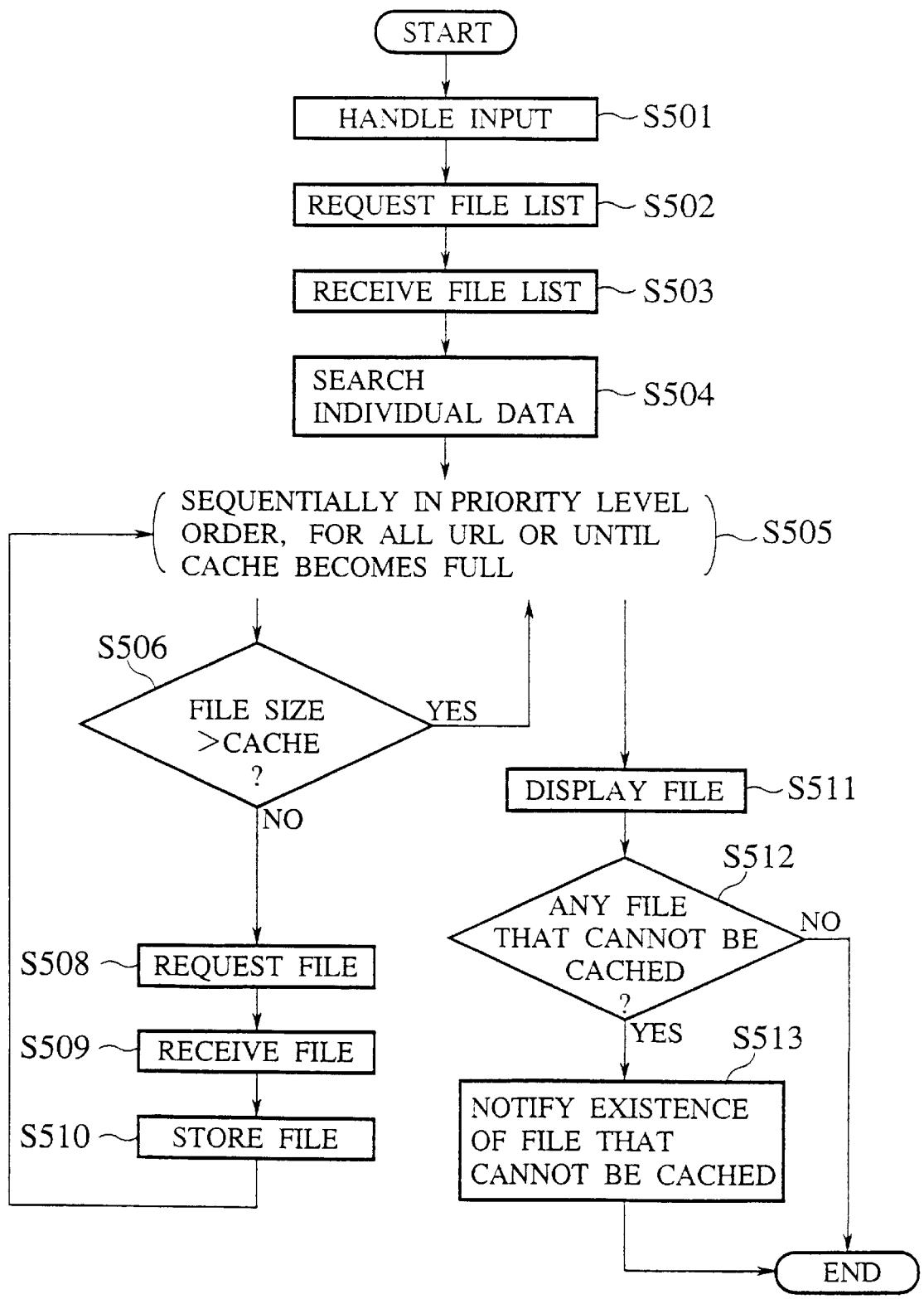
FIG. 7 is a flow chart for an exemplary processing by the viewer program of FIG. 6 in the first embodiment of the present invention.

FIG. 7 shows an exemplary flow chart for the processing by the viewer program 400 of FIG. 6 in a case where the individual data of each file is also described in the file list. FIG. 7 shows a part of the operation of the viewer program 400 starting from the handling of a request from the user up to the display of a file.

First, when a request from the user is handled (step S501), the file list corresponding to that request is requested by a file list request processing to the file server 110 connected with the file requesting client 120 used by the user (step S502).

Next, the viewer program 400 receives the file list transmitted from the file server 110 in response to the file list request of the step S502 by a file list receiving processing (step S503). Then, by an individual data search processing, the priority level of each file in the received file list is checked, and the files are sorted according to the priority level order (step S504).

In the subsequent processing starting from the step S505, the processing is sequentially carried out for the sorted files in the priority level order, for all the URLs or until the cache region 121a becomes full.

First, at the step S506, a file size and a size of a vacant region of the cache region 121a are compared. When the file size is greater than the vacant region size, the processing starting from the step S505 is continued for a next file. When the file size is not greater than the vacant region size, this file is requested to the file server 110 by a file request processing at the step S508 and received from the file server 110 by a file receiving processing at the step S509, and the received file is stored into the cache region 121a by a file storing processing at the step S510. After that, the processing starting from the step S505 is continued for a next file. When the condition of the step S505 is satisfied, the processing proceeds to the step S511, at which the file requested by the user is displayed. Then, whether there is any file which cannot be cached is checked at the step S512, and if there is no such file, the processing is terminated. If there is such a file, the existence of such a file is notified to the user at the step S513 and then the processing is terminated.

Next, another file transfer method for realizing this first embodiment will be described.

The viewer programs include those which are equipped with a processing system for interpreting and executing a program transmitted from the file server 110. For example, using the viewer equipped with a function for interpreting and executing the Java language, it is possible to realize the file transfer method of this first embodiment by receiving from the file server 110 a program which contains the network request processing function, the file receiving processing function, the file storing processing function and the file display processing function, which are described in the Java language, and executing this program at the viewer side.

FIG. 8 shows an exemplary description of the menu which is a list of files that can be provided by the file server 110 for a case of realizing the file transfer method of this first embodiment by utilizing the Java program (called applet). In FIG. 8, the menu 700 is described as the HTML file, in which titles of files that can be provided by the file server 110 are enumerated as in a portion 701. Here, as one example, FIG. 8 shows a case in which an actually specified link destination is not a URL of a file but a URL 702 of an HTML file which is formed only by an applet for realizing the file acquisition and which is not containing that file.

The HTML file containing the applet can have a description as shown in FIG. 9, for example. In FIG. 9, the HTML file 900 containing the applet has a description of a tag 910 for specifying the applet. Within this tag 910, the applet name is specified at a part following "CLASS=" as shown in a portion 901.

Also, in an example of FIG. 9, the file list is described as an argument of the applet as shown in a portion 902. For this argument, the URL of the file list may be described rather than the file list itself. In such a case, at the file server side, the file list is produced and stored into the storage medium 156 of the file server 110.

Figure 10:
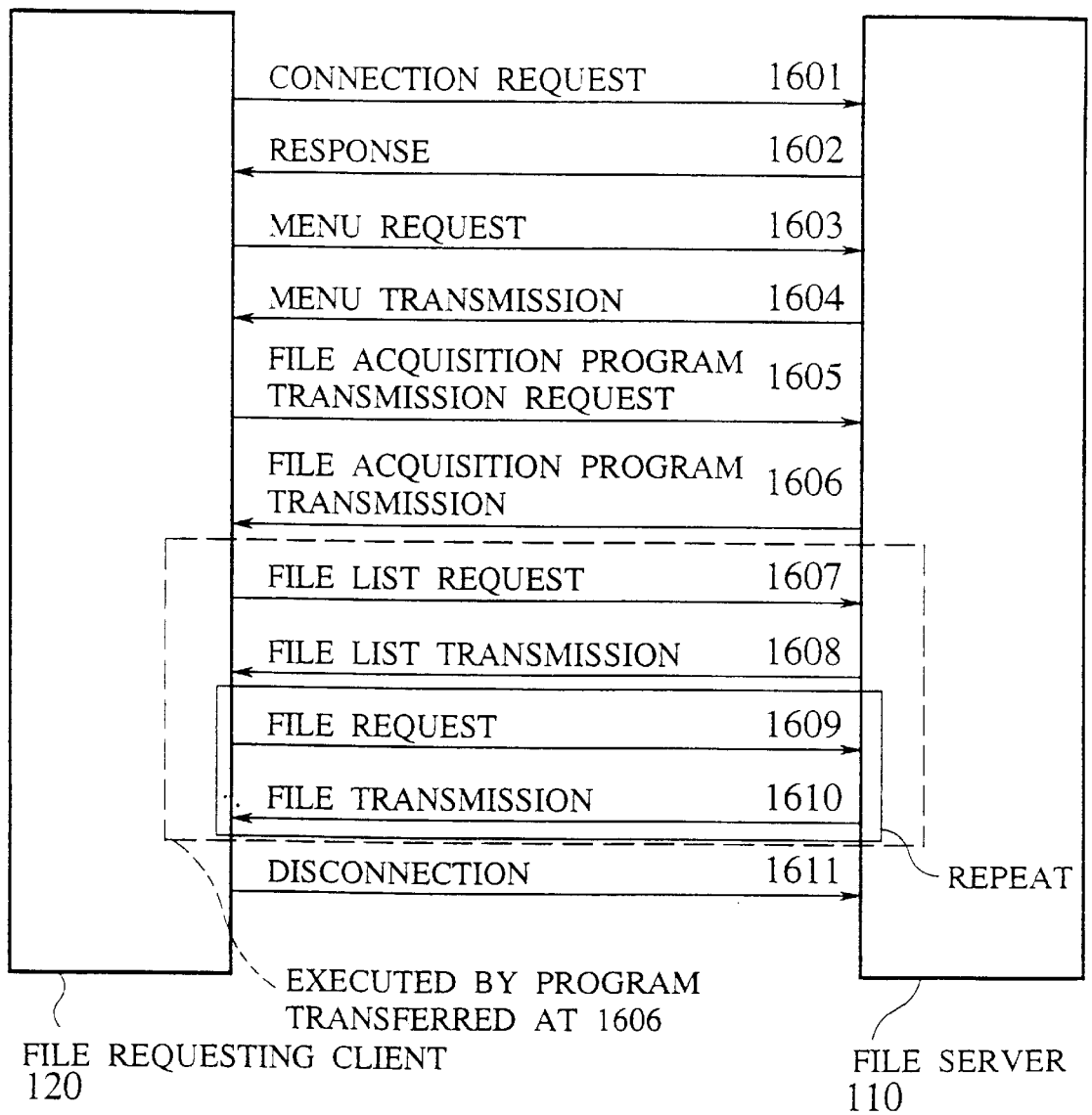
FIG. 10 is a sequence chart for another exemplary file transfer procedure in the first embodiment of the present invention.

FIG. 10 shows an exemplary file transfer procedure in a case of transferring the applet for carrying out the file acquisition in terms of communications between the file server 110 and the file requesting client 120. Here, the processings at 1601 to 1604 and 1611 are substantially similar to those of 601 to 604 and 609 of FIG. 2 described above.

After the menu transmission 1604, when the user selects a file 701 from the menu 700 transmitted from the file server 110, the file requesting client 120 requests the HTML file containing the applet for acquiring that file and its related files to the file server 110 according to the URL described at the portion 702 of the menu 700 (1605). Then, this HTML file is transmitted from the file server 110 to the file requesting client 120 (1606), and the applet contained in that HTML file is activated to carry out the file acquisition processing (1607–1610). In this example, the file acquisition applet uses the URL of the file list as its argument. This applet requests that file list to the file server 110 (1607), and when the requested file list is transmitted from the file server 110 (1608), this applet requests the requested file and its related files according to the content of the file list received from the file server 110 (1609) and receives these files (1610) sequentially.

Figure 11:
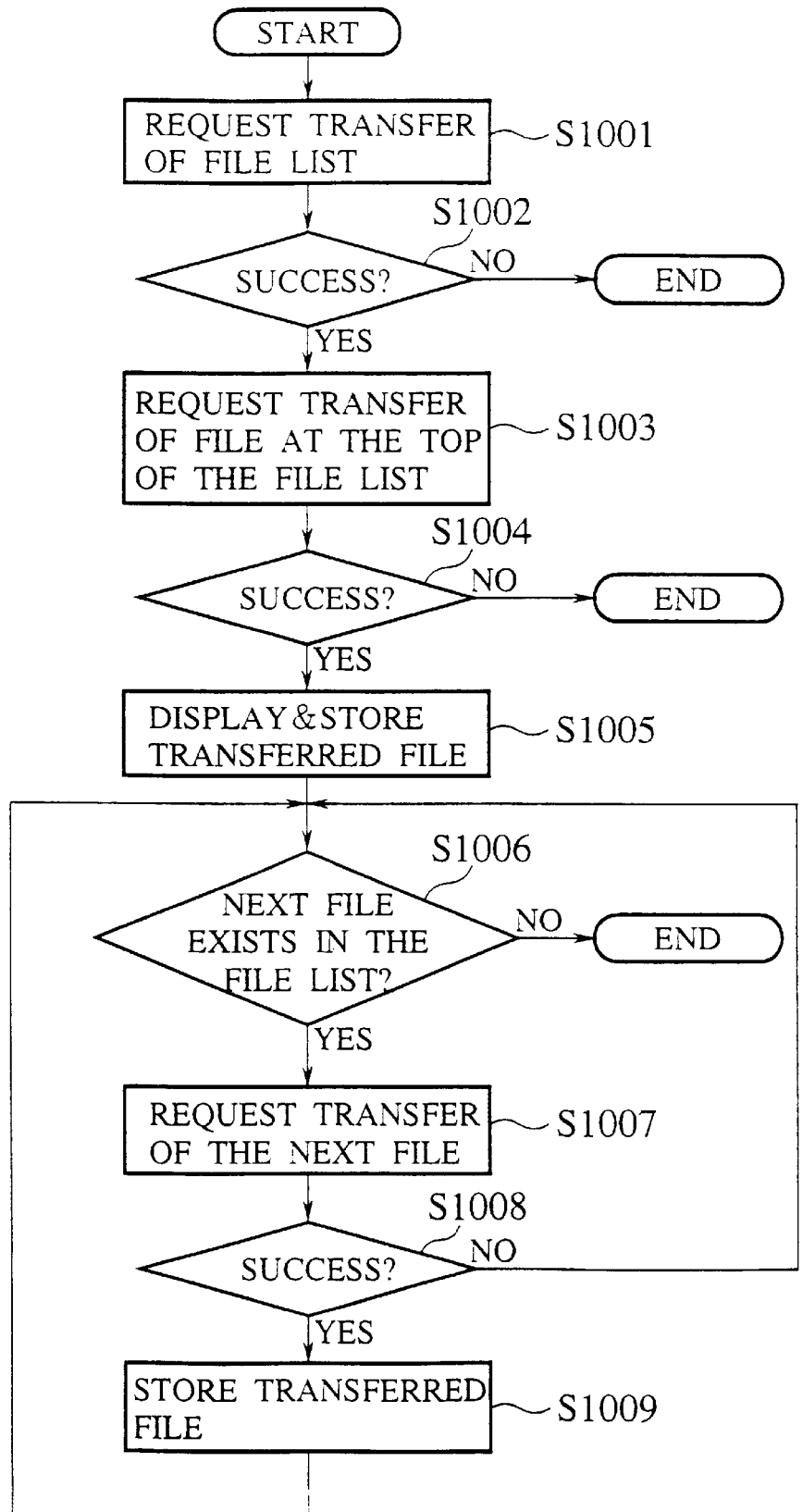
FIG. 11 is a flow chart for an exemplary processing by an applet in the first embodiment of the present invention.

FIG. 11 shows an exemplary flow chart for the processing by the applet which realizes the file transfer method of this first embodiment. In FIG. 11, the applet first requests the transfer of the file list (S1001), and when the file list is successfully transferred (S1002 YES), the applet requests the transfer of the file at the top of the file list (S1003). When this first file is successfully transferred (S1004 YES), this file is displayed at the viewer while storing this file (S1005). For each of the second and subsequent files, as long as a next file exists in the file list (S1006 YES), the applet requests the transfer of the next file (S1007), and when this file is successfully transferred (S1008 YES), this file is stored (S1009). Note that the processing with respect to the second and subsequent files and the processing with respect to the file to be displayed may be carried out in the reversed order or in parallel.

Figure 12:
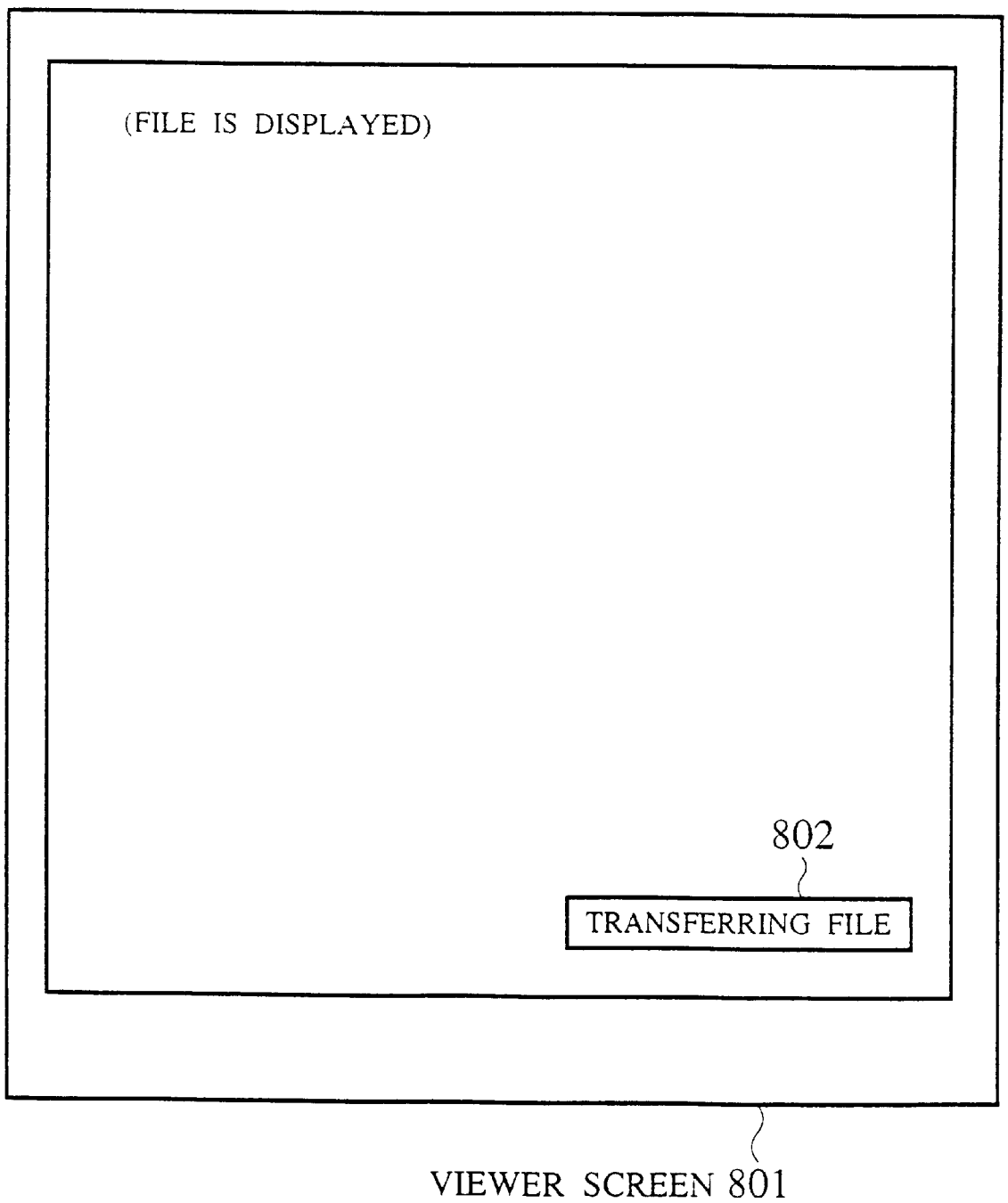
FIG. 12 is an illustration of an exemplary viewer screen in the first embodiment of the present invention.

FIG. 12 shows an exemplary viewer screen for a case of notifying the user about the fact that the file requesting client 120 is in a process of receiving file from the file server 110. FIG. 12 shows an exemplary case in which character string indicating that it is in a process of receiving file ("transferring file" at a portion 802) is displayed on the viewer screen 801 of the file requesting client 120. Note that besides the display of the character string on the screen as shown in FIG. 12, there are many other means for notifying the fact that it is in a process of receiving file such as the notification by sounds, the notification by images, etc.

In the example described above, it is assumed that the link destination is not the requested file, but when the requested file is the HTML file, it is also possible to use the requested file which contains the applet for realizing the file acquisition as the link destination. In such a case, the file shown in FIG. 9 is unnecessary, and it suffices to describe the URL of the requested file at the portion 702 of the menu 700 shown in FIG. 8.

Figure 13:
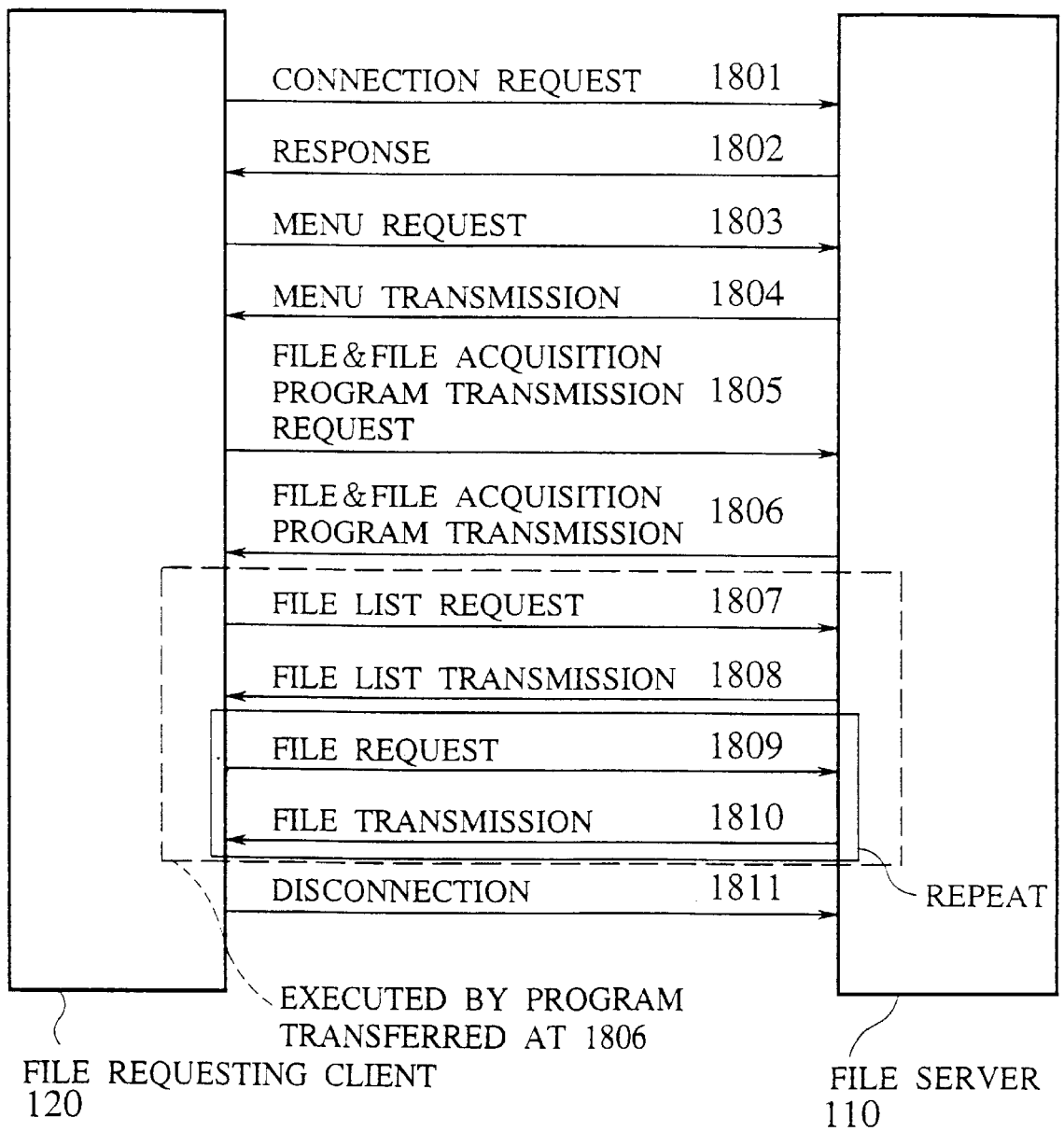
FIG. 13 is a sequence chart for still another exemplary file transfer procedure in the first embodiment of the present invention.

FIG. 13 shows an exemplary file transfer procedure in such a case in terms of communications between the file server 110 and the file requesting client 120. Here, the processings at 1801 to 1804 and 1807 to 1811 are substantially similar to those of 1601 to 1604 and 1607 to 1611 of FIG. 10 described above. In FIG. 13, the requested file and the file acquisition program (applet) contained therein are requested to the file server 110 at 1805, and received at the file requesting client 120 at 1806. Then, while the requested file is displayed at the viewer, the applet described in that requested file is activated and the transfer of the second and subsequent files are carried out at 1807 to 1810. Consequently, the file list does not includes the description concerning the requested file in this case.

The example of FIG. 8 to FIG. 13 shows a case of downloading the Java program from the server side, but the present invention is not limited to such a case. For example, it is also possible to provide a program for realizing the algorithm according to FIG. 11 at the client side in advance so that this program carries out the file list transfer request and the file transfer request at the client side. In such a case, it suffices to use a description for activating that program which is provided at the client side in advance, in place of the applet name at the portion 901 of FIG. 9. Also, in such a case, the steps 1805 and 1806 in the procedure of FIG. 13 will be unnecessary.

As described, according to this first embodiment, when the file requesting client requests the file provided by the file server, by providing a list of files related to the requested file from the file server to the file requesting client, the file requesting client can also request the related files of the requested file at that point, according to that file list. By storing the requested file and the related files transferred from the file server in response to the request into the storage medium at the file requesting client side, it becomes possible to refer to not just the requested file but also its related files even when the connection with the file server is disconnected.

Referring now to FIG. 14 to FIG. 22, the second embodiment of a file transfer method, a file server device, and a file requesting client device according to the present invention will be described in detail.

This second embodiment is directed to a modification of the first embodiment described above, which stores concatenated files each of which is formed from multiple files, or compressed concatenated files, in the storage medium 156 of the file server 110, instead of the file lists 112, or the files 111 and the file lists 112 used in the first embodiment.

In this second embodiment, a system has a configuration substantially similar to that shown in FIG. 1 for the first embodiment, except for storing the concatenated files or compressed concatenated files in place of the file lists or the files and the file lists at the file server 110.

Figure 14:
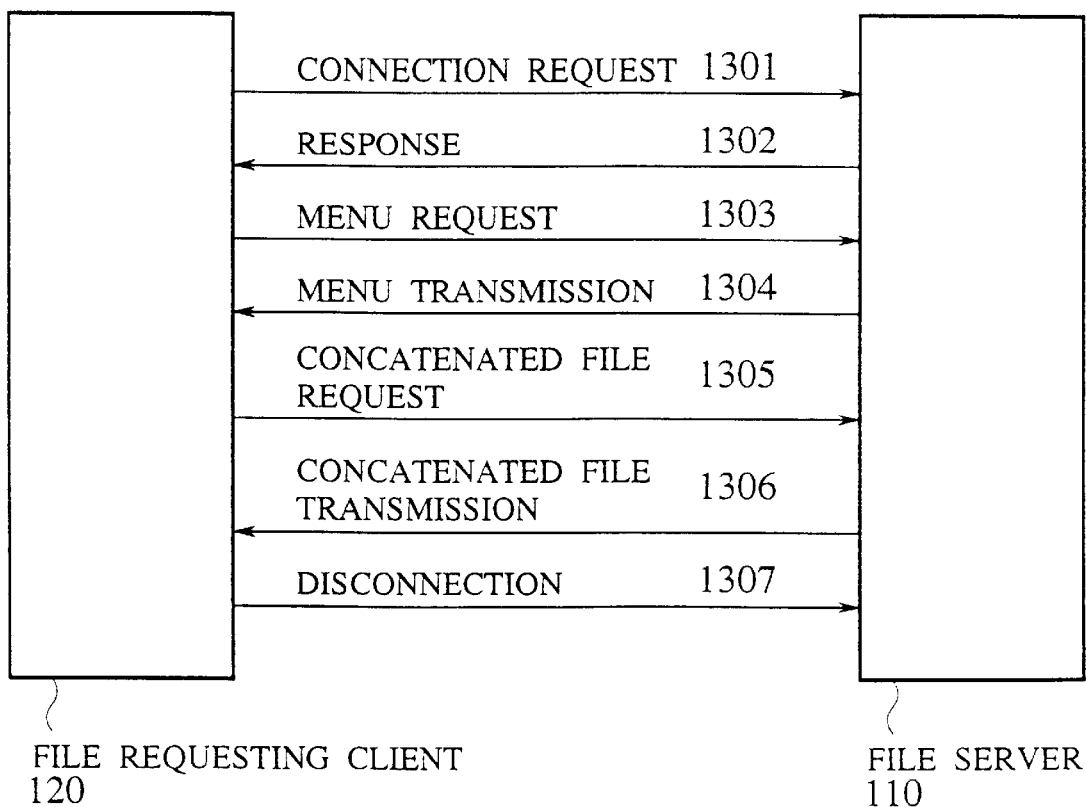
FIG. 14 is a sequence chart for an exemplary file transfer procedure in the second embodiment of the present invention.

FIG. 14 shows an exemplary file transfer procedure in this second embodiment in terms of communications between the file server 110 and the file requesting client 120.

When the user wishes to receive a desired file, the user first connects the file requesting client 120 to an appropriate file server 110 by using the communication device 127. Then, in order to carry out the processing necessary in creating a state in which communications by the HTTP between the file server 110 and the file requesting client 120 are possible, a connection request 1301 is sent from the file requesting client 120 to the file server 110. At the file server 110 side, when the connection request 1301 from the file requesting client 120 is received, a response 1302 is returned after a necessary processing is carried out. Here, the processings for the connection request 1301 and the response 1302 can be carried out by utilizing the PPP (Point-to-Point Protocol) or the DHCP (Dynamic Host Configuration Protocol), for example.

After the connection processing between the file server 110 and the file requesting client 120 is completed, the file requesting client 120 is now connected with the file server 110 by the HTTP, and a menu which is a list of files that can be provided by the file server 110 is requested by a menu request 1303. In response to the menu request 1303, the file server 110 transmits a corresponding menu to the file requesting client 120 by a menu transmission 1304. Here, the menu is given as home pages available at the file server 110 or pages that can be reached by tracing links from these home pages. When the user selects a desired file from the menu, and a concatenated file request 1305 for the selected file is sent to the file server 110. At the file server 110, when the concatenated file request 1305 from the file requesting client 120 is received, the concatenated file corresponding to the selected file is sent to the file requesting client 120 by a concatenated file transmission 1306.

Then, at the file requesting client 120, the individual files are extracted from the concatenated file transmitted from the file server 110 by the concatenated file transmission 1306, and stores the individual files in the cache region 121a of the storage medium 121 of the file requesting client 120.

When all the necessary files are received and the user wishes to disconnect the connection with the file server 110, a disconnection request 1307 is sent from the file requesting client 120 to the file server 110. Here, when the disconnection request 1307 is entered by the user, the file requesting client 120 checks whether the receiving of all the necessary files has been completed or not, and if it has been completed, the disconnection request 1307 is sent to the file server 110.

On the other hand, if the file server 110 is still in a middle of the transmission of necessary files, an abort processing is carried out, and the disconnection request 1307 is sent after the abort processing is completed. The abort processing can be initiated from either one of the file server 110 and the file requesting client 120. When the abort is issued, the file requesting client 120 stores only those files whose transmission has already been completed among multiple files contained in the concatenated file, and those files which are in a middle of transmission or which are not yet transmitted are not stored. Else, it is also possible to not to store all the files contained in the concatenated file that is received in response to the request for which the abort is issued. Alternatively, if the receiving of all necessary files has not been completed when the disconnection request 1307 is entered by the user, instead of carrying out the abort processing, it is also possible to wait for the completion of the receiving of all necessary files and send the disconnection request 1307 to the file server 110 after the completion of the receiving of all necessary files. Else, it is also possible to allow the user to select the processing in a case of the disconnection request in a middle of the file transmission.

FIG. 15 shows an exemplary description of the menu which is transmitted from the file server 110. In this menu 2000 of FIG. 15, the description of a URL of a concatenated file in which multiple files including the requested file are concatenated is used as in a portion 2002 along with the file title in a portion 2001, instead of the URL of the file list used in the menu of FIG. 3.

It is also possible to describe the URL of the requested file in the 2002 portion of the menu 2000 while describing the URL of the concatenated file within that file, instead of the URL of the file list used in the menu of FIG. 3, as shown in FIG. 16. In the requested file 1600 of FIG. 16, the description of the URL of the concatenated file is given in a form of being enclosed by a special tag called <PREFETCH ARCHIVE>. In such a case, when the file requesting client 120 requests the requested file and the requested file is received from the file server 110, that requested file is displayed at the viewer of the file requesting client 120. In addition, the viewer also detects the URL of the concatenated file which is enclosed by the special tag and described within that requested file, and this concatenated file is requested to the file server 110. As a result, the file requesting client 120 can acquire the related files corresponding to the requested file. In such a case where the location of the concatenated file is described within the requested file, the requested file is not contained in the concatenated file.

In the example described above, it is assumed that the file requesting client 120 is equipped with a function for acquiring the related files from the concatenated file corresponding to the requested file, but it is also possible to realize the same operation by a program transferred from the file server 110. In such a case, the URL of the HTML file which contains the applet having the above function is described at the portion 2002 for the URL of the concatenated file in the menu of FIG. 15.

Figure 17:
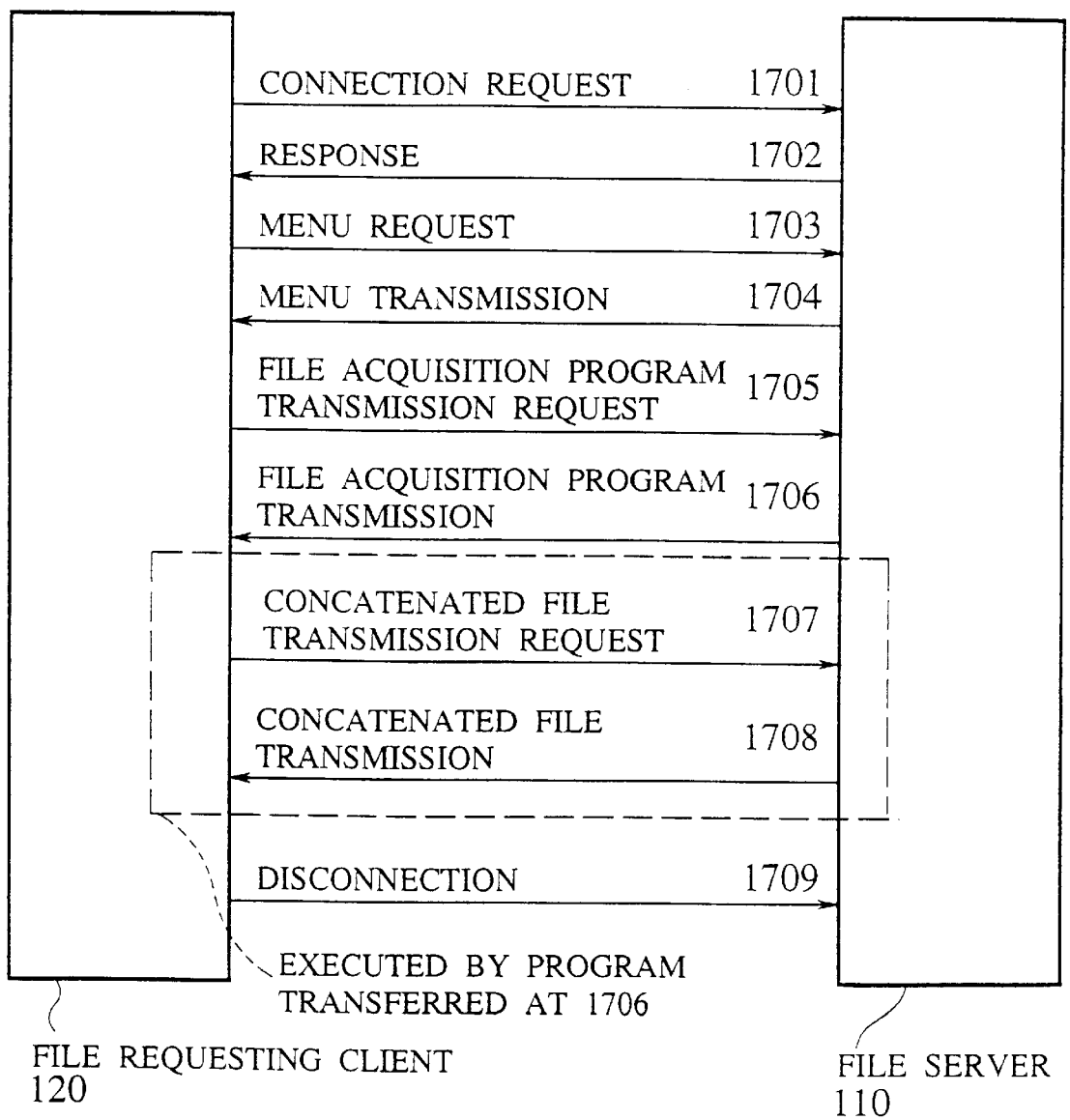
FIG. 17 is a sequence chart for another exemplary file transfer procedure in the second embodiment of the present invention.

FIG. 17 shows an exemplary file transfer procedure in such a case of realizing the acquisition of the related files by a program transferred from the file server 110, in terms of communications between the file server 110 and the file requesting client 120. Here, the processings at 1701 to 1704 and 1707 to 1709 are substantially similar to those of 1301 to 1304 and 1305 to 1307 of FIG. 14 described above. In FIG. 17, the menu transmitted at 1704 is in a format shown in FIG. 18. When a file title 2101 of a desired file is selected from this menu 2100 of FIG. 18, the HTML file containing the concatenated file acquisition applet (file acquisition program) which is indicated by the URL described at a portion 2102 of the menu 2100 is requested from the file requesting client 120 to the file server 110 (1705), and the HTML file 2200 containing the applet (file acquisition program) as shown in FIG. 19 is transmitted from the file server 110 to the file requesting client 120 (1706).

Then, the applet 2201 contained in a tag portion 2210 of this HTML file 2200 is activated and the processing for the file acquisition is carried out. More specifically, the URL 2202 of the concatenated file is described in the tag portion 2210 as an argument of the applet, and this concatenated file is requested to the file server 110 (1707), and this concatenated file is received from the file server 110 (1708). In addition, this applet develops the concatenated file and stores the requested file and its related files in the cache region 121a of the storage medium 121 of the file requesting client 120, and carries out a processing to display only the requested file at the viewer.

In the example described above, it is assumed that the link destination is not the requested file, but when the requested file is the HTML file, it is also possible to use the requested file which contains the applet for realizing the file acquisition as the link destination. In such a case, it suffices to describe the URL of the requested file at the portion 2102 of the menu 2100 shown in FIG. 18. Consequently, the requested file is requested to the file server 110 at 1701 of FIG. 17, and received by the file requesting client 120 at 1702. Then, that requested file is displayed at the viewer, while the applet described within that requested file is activated. Note that when the requested file contains the description for specifying the applet, the requested file may not be contained in the concatenated file.

Next, the information to be provided within the concatenated file will be described.

The file requesting client 120 stores each file extracted from the concatenated file so that the user can use the extracted files similarly as in a case of transferring these files separately. To this end, the URL of each file in the concatenated file must be recognizable. For example, the file name of each file can be set identical to the URL of each file. Else, the concatenated file may contain a description in which a file name of each file and the URL of each file in the concatenated file are set in correspondence. In addition, even in such a case, by including the individual data of each file in the description for setting correspondences between file names and the URLs as in a case of FIG. 5 described above, it is also possible to select files to be stored in a case where the cache region of the file requesting client 120 is insufficient. Note that the concatenated file may be maintained in a compressed form.

The example of FIG. 14 to FIG. 19 shows a case of downloading the Java program from the server side, but the present invention is not limited to such a case. For example, it is also possible to provide the Java program at the client side in advance so that this program can be used by calling it up. In such a case, it suffices to use a description for activating that program which is provided at the client side in advance, in place of the applet name at the portion 2201 of FIG. 19. Also, in such a case, the steps 1705 and 1706 in the procedure of FIG. 17 will be unnecessary.

FIG. 20 shows another exemplary description of the menu stored in the file server 110. Here, the menu 1200 described in the HTML format has a comment line 1202 which contains a description 1203 for specifying a file to be actually requested to the file server 110 when this file is selected, in addition to a link 1201 to a file that can be provided by the file server 110. In an example shown in FIG. 20, the description 1203 for specifying a file to be actually requested to the file server 110 is given by a description of the URL of the concatenated file for the file corresponding to the user's request and its related files. For this description 1203 for specifying a file to be actually requested to the file server 110, besides the URL of the concatenated file, it is also possible to use a description for indicating a location of a compressed file obtained by compressing the concatenated file, a description for indicating a location of a file containing a program for file acquisition, a description for enumerating locations of the file corresponding to the user's request and its related files, etc.

Figure 21:
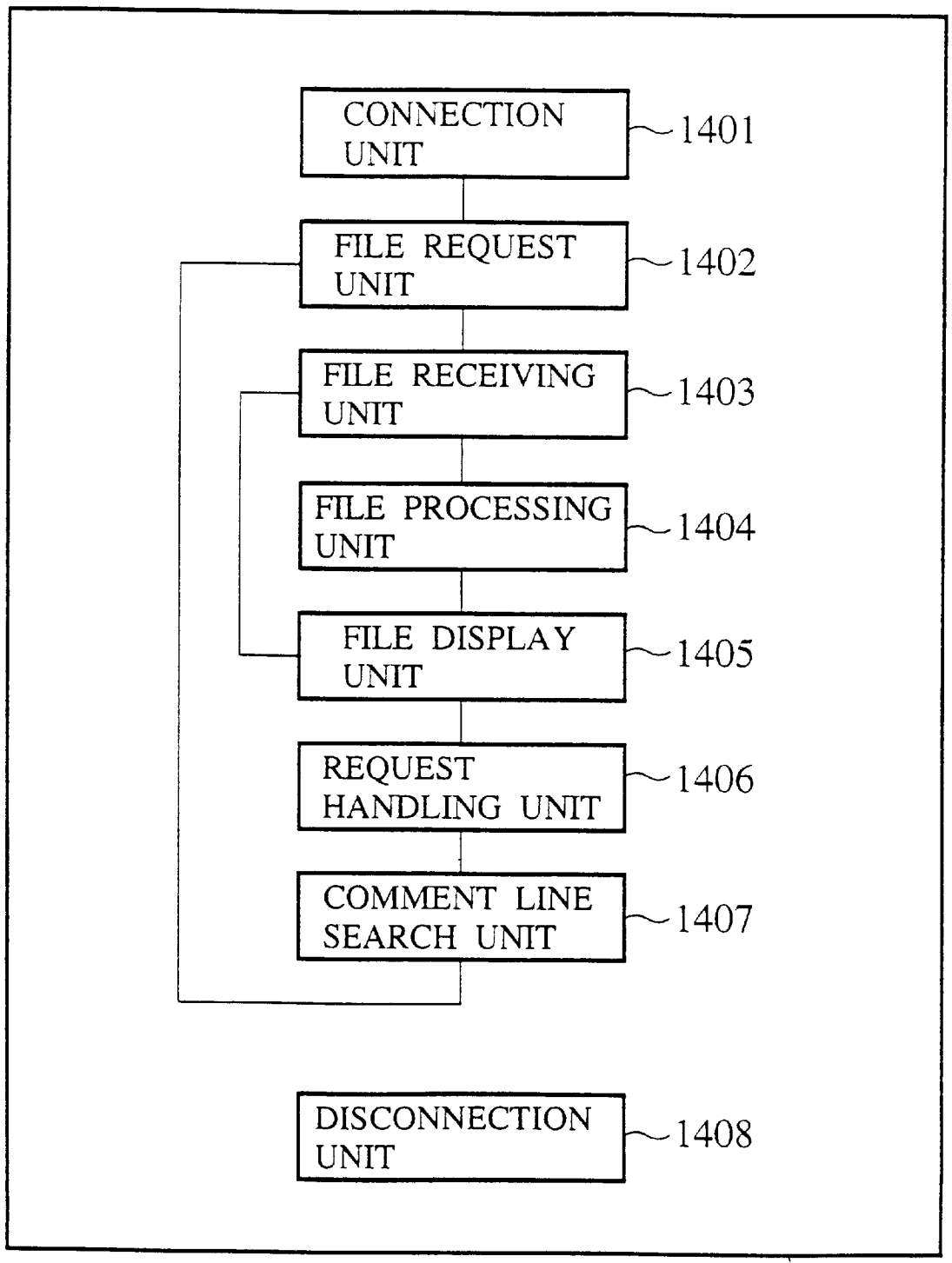
FIG. 21 is a block diagram of an exemplary viewer program that can be used in the second embodiment of the present invention.

When the menu provided by the file server 110 is in a format as shown in FIG. 20, the configuration of the viewer program at the file requesting client 120 can be as shown in FIG. 21, for example.

In FIG. 21, the viewer program 1400 to be used as the file display program 130 of the file requesting client 120 comprises a connection unit 1401, a file request unit 1402, a file receiving unit 1403, a file processing unit 1404, a file display unit 1405, a request handling unit 1406, a comment line search unit 1407, and a disconnection unit 1408.

In this viewer program 1400, the connection unit 1401 carries out the processing necessary in creating a state for enabling communications by the HTTP between this file requesting client 120 and the file server 110 which is connected with this file requesting client 120, and after the processing by the connection unit 1401 is finished, the file is requested to the file server 110 by the HTTP at the file request unit 1402. The file transmitted from the file server 110 in response to the request from the file request unit 1402 is received at the file receiving unit 1403.

The file received by the file receiving unit 1403 is stored into the cache region 121*a* of the storage medium 121 by the file processing unit 1404, while the file requested by the user is displayed on a viewer by the file display unit 1405.

A request of the user is handled at the request handling unit 1406, and a comment line corresponding to the request handled by the request handling unit 1406 is searched by the comment line search unit 1407. When the user wishes to carry out the disconnection, the disconnection processing is carried out by the disconnection unit 1408.

In this viewer program 1400, after the connection unit 1401 carries out the connection processing, the menu stored in the file server 110 which is the connection destination is requested by the HTTP at the file request unit 1402. Then, the user selects a file from the menu displayed at the viewer by the file display unit 1405. The user's selection is handled at the viewer by the request handling unit 1406, and the comment line corresponding to the file selected by the user is searched by the comment line search unit 1407.

Then, the URL of the file searched by the comment line search unit 1407 is requested to the file server 110 at the file request unit 1402, and the file transmitted from the file server 110 in response is received at the file receiving unit 1403. At this point, when the file described in the comment line is the concatenated file corresponding to the file requested by the user, the individual files are extracted from the concatenated file by the file processing unit 1404, and these files are stored in the cache region 121*a* of the storage medium 121 of the file requesting client 120.

Note that the comment line may describe the URL indicating the compression file of the concatenated file, or the URLs of the individual files which are not concatenated. When the URLs of the individual files (the file requested by the user and its related files) are described, the processings of the file request unit 1402 to the file processing unit 1404 are repeated for as many times as a number of files described in the comment line. At the processing of the file processing unit 1404 in this case, the file received by the file receiving unit 1403 is stored in the cache region 121*a* of the storage medium 121 of the file requesting client 120.

Even in this example of FIG. 21, when the file received by the file receiving unit 1403 is the concatenated file, the file name and the URL can be set in correspondence at a time of storing the files in the cache region 121*a* of the storage medium 121 of the file requesting client 120 similarly as in an example described in relation to FIG. 14. Also, the processing by the disconnection unit 1408 at a time of the disconnection can be carried out similarly as in an example described in relation to FIG. 6.

Also, even in this case of transferring the concatenated file, by providing a processing system for interpreting and executing a program transmitted from the file server 110 within the file requesting client 120, it is possible to realize the file transfer method of this second embodiment by receiving from the file server 110 a program which contains the network request processing function, the file receiving processing function, the file storing processing function and the file display processing function, which are described in the Java language, and executing this program at the viewer side, similarly as in the first embodiment described above.

In this case, the URL of the HTML file which contains the program for carrying out the related file acquisition processing can be described in the comment line, for example. When the user selects a file from the menu displayed at the viewer, the corresponding comment line is searched. As a result, the HTML file described in the comment line rather than the requested file is requested to the file server 110. Also, similarly as in the first embodiment described above, the HTML file may possibly be the requested file itself.

In addition, in such a case, it is also possible to described the URL of the requested file which contains the description of the applet directly at the portion 1201 of FIG. 20 instead of describing the comment line.

As described, according to this second embodiment, when the file requesting client requests the file provided by the file server, by providing the concatenated file in which at least the related files of the requested file are concatenated, the file requesting client can acquire the requested file and its related files at the same time. By extracting individual files from the transferred concatenated file and storing them into the storage medium at the file requesting client, it becomes possible to refer to not just the requested file but also its related files even when the connection with the file server is disconnected.

It is to be noted that there can be cases in which the file server 110 is connected with both the file requesting client which has the viewer compatible with the file acquisition procedure of the present invention and the file requesting client which has the viewer not compatible with the file acquisition procedure of the present invention. However, the file server 110 can utilize the same interface (menu) in a case of handling requests from both of the viewer compatible with the file acquisition procedure of the present invention and the viewer not compatible with the file acquisition procedure of the present invention.

For example, in a case of transferring the concatenated file, when the menu transmitted from the file server 110 is in a format shown in FIG. 20, the viewer not compatible with the file acquisition procedure of the present invention will ignore the description in the comment line, and only the file described in the link 1201 will be requested, so that the normal operation can be obtained even when the WWW viewer program which is not compatible with the file acquisition procedure of the present invention is installed in the file requesting client.

Figure 22:
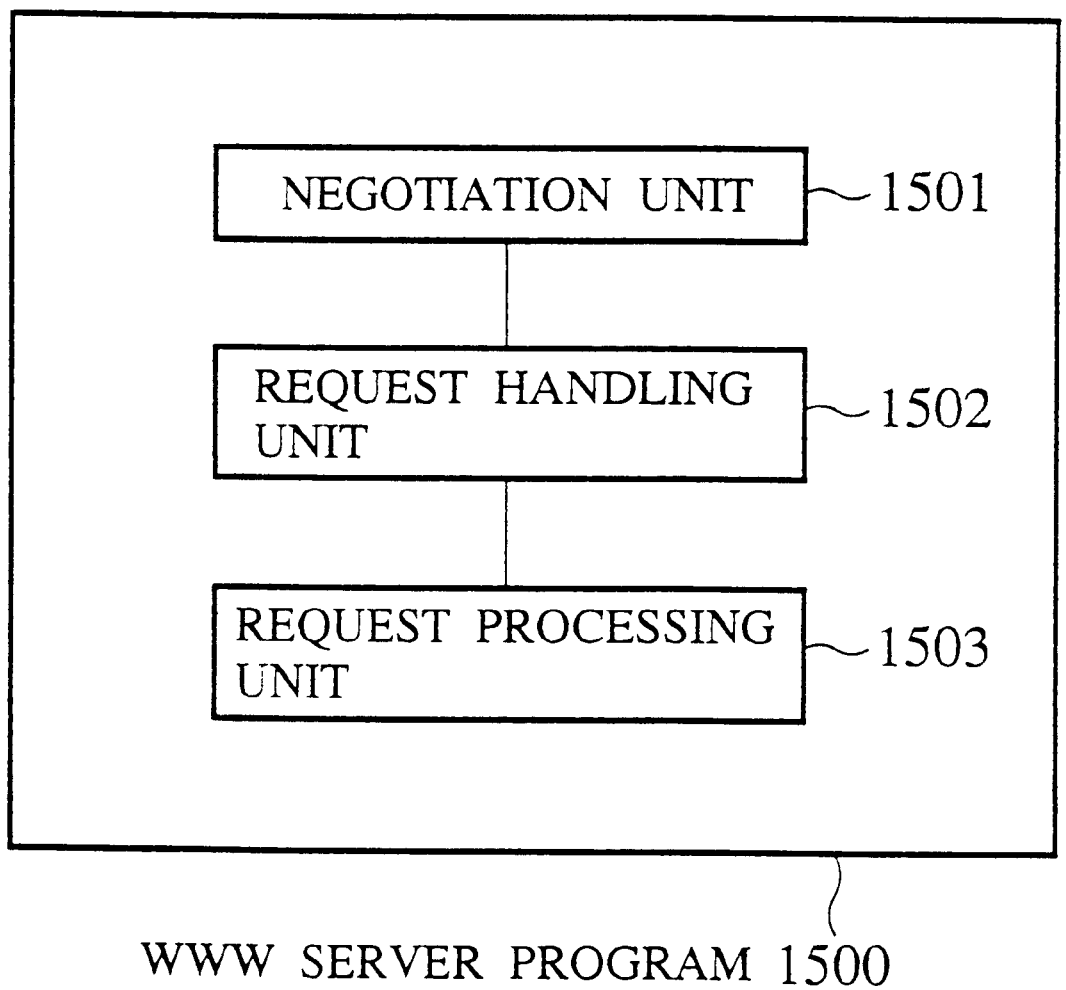
FIG. 22 is a block diagram of an exemplary WWW server program that can be used in the first and second embodiments of the present invention.

Also, in the file server 110, by using a configuration as shown in FIG. 22 for the file server program 150 including the request handling 151 and the request processing unit 152 of FIG. 1, it becomes possible to deal with requests from both the viewer compatible with the file acquisition procedure of the present invention and the view not compatible with the file acquisition procedure of the present invention. This is an effective approach when there exists the file requesting client which is equipped with a function for dealing with the file acquisition procedure of the present invention, but not with a function for analyzing the comment line in the menu.

In FIG. 22, the WWW server program 1500 to be installed into the file server 110 comprises a negotiation unit 1501, a request handling unit 1502, and a request processing unit 1503. In this WWW server program 1500, when the HTTP connection is to be set up with the viewer which is the client, the negotiation unit 1501 checks whether the viewer is compatible with the file acquisition procedure of the present invention. Then, after the HTTP connection is set up, the WWW server program 1500 handles the request from the viewer at the request handling unit 1502. At this point, the file requested from the viewer is only the file which is described in the links 1101 and 1102 of FIG. 3 or the link 1201 of FIG. 20, for both the viewer compatible with the file acquisition procedure of the present invention and the viewer not compatible with the file acquisition procedure of the present invention.

Here, when the viewer which transmitted the request handled by the request handling unit 1502 is judged as compatible with the file acquisition procedure of the present invention by the negotiation unit 1501, the request processing unit 1503 transmits the concatenated file corresponding to the request handled by the request handling unit 1502 to the viewer. On the other hand, when the viewer is judged as not compatible with the file acquisition procedure of the present invention, the request processing unit 1503 transmits only the file corresponding to the request handled by the request handling unit 1502 to the viewer.

In the file acquisition procedure of the present invention, the communication time can be shortened by modifying the HTTP such that a plurality of messages can be transmitted within one HTTP connection. In a case of using the viewer which utilizes such a modified HTTP, the negotiation unit 1501 can check whether the viewer is compatible with the file acquisition procedure of the present invention or not by checking whether the viewer is communicating by using the modified HTTP or not. When the viewer uses the usual HTTP, whether the viewer is compatible with the file acquisition procedure of the present invention or not can be checked by checking whether the viewer is compatible with the Java language or not, for example.

Note that the file transmitted by the request processing unit 1503 when the viewer is compatible with the file acquisition procedure of the present invention may not necessarily be the concatenated file as described above, and can be a file in another format.

In the file transfer method of the first and second embodiments described above, when an amount of data for the related file corresponding to the file requested from the client to the server is large, a time required for the completion of the transfer of all the files becomes long and the problem such as the increase of traffic in a network can be caused. In addition, when many files are transferred while a vacant region in the storage medium of the client is not sufficiently large, the majority of the file system of the client may be occupied by the transferred files. Moreover, in a case of transferring the concatenated file, when the transfer of the file is interrupted in response to a request from the user, it may become impossible to utilize even those files for which the transfer had been completed by then.

Also, even when the client is not capable of displaying static images or video images, or executing audio data, there are cases in which files containing such image or audio data are transferred to the client. Transferring such a file that cannot be used at the client is a waste of the storage medium of the client, and can lead to a meaningless increase of traffic in a network.

In the following, the third and fourth embodiments for resolving these problems associated with the first and second embodiments will be described.

Referring now to FIG. 23 to FIG. 29, the third embodiment of a file transfer method, a file server device, and a file requesting client device according to the present invention will be described in detail.

Figure 23:
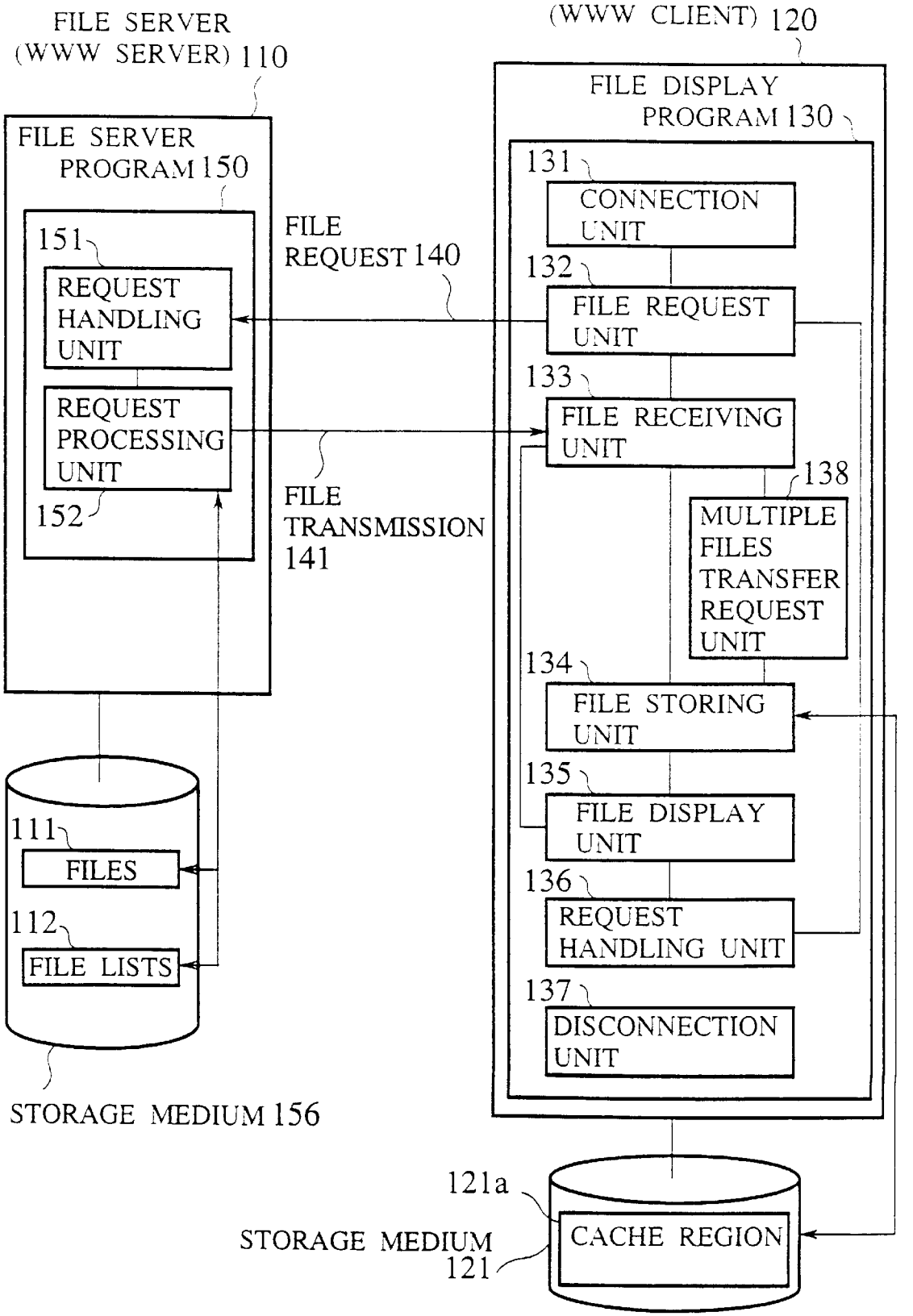
FIG. 23 is a block diagram of an information communication system for realizing the file transfer method according to the third embodiment of the present invention.

FIG. 23 shows a configuration of an information communication system in this third embodiment and functional configurations of programs used in this system. This information communication system is a client-server system for providing various files (hypertext in HTML format, static images, video images, audio data, etc.) from a server to a client by utilizing the network environment such as that of the Internet, for example. This system of FIG. 23 generally comprises a file server 110 which operates as a WWW server for providing files, and a file requesting client 120 which operates as a WWW client for requesting files.

On the file server 110, a file server program 150 is operating. This file server program 150 functions as the WWW server program, and includes a request handling unit 151 and a request processing unit 152. The request handling unit 151 is a program for handling a request such as a file transfer request according to a file transfer protocol such as HTTP from a file display program 130 operating on the file requesting client 120. The request processing unit 152 is a program for carrying out actual processing according to the requests handled by the request handling unit 151. For example, when the request handling unit 151 handles the file transfer request 140, the corresponding file 111 is retrieved from the storage medium 156, and when this file is found, the file transfer 141 is carried out.

On the file requesting client 120, the file display program 130 is operating. This file display program 130 functions as the WWW client program (WWW browser), and includes a connection unit 131, a file request unit 132, a file receiving unit 133, a file storing unit 134, a file display unit 135, a request handling unit 136, a disconnection unit 137, and a multiple files transfer request unit 138.

The connection unit 131 is a program for carrying out a connection to the file server 110 by the protocol such as TCP/IP. The file request unit 132 is a program for issuing the file transfer request to the file server 110 by the file transfer protocol such as HTTP. The file receiving unit 133 is a program for receiving a file provided from the file server 110.

The file storing unit 134 is a program for caching (temporarily storing) a file received from the file server 110 into a cache region 121*a* of a storage medium 121. The file cached into the cache region 121*a* is automatically allocated with a name and stored without a command from the user, unlike a usual file which is stored using a file name explicitly specified by the user. A stored position and a file name of a file cached into the cache region 121*a* are independently managed by the file display program 130.

This cache region 121*a* is utilized in order to relax the network congestion, and when a display request for the file stored in the cache region 121*a* is issued from the user, basically, the access to the file server 110 is not made and the corresponding file is read out from the cache region 121*a* and displayed on a screen. It is also possible to operate this system in such a manner that, in a case where the file requesting client 120 notifies the creation time of the cached file to the file server 110 and inquires whether this file is the latest file or not, only when the content of the corresponding file has been updated, the updated file is transferred from the file server 110 to the file requesting client 120.

The file display unit 135 is a program for displaying the requested file on a screen. The request handling unit 136 is a program for handling requests for file transfer or file display from the user or program. The disconnection unit 137 is a program for disconnecting a connection to a network.

The multiple files transfer request unit 138 is a program for commanding the file request unit 132 to issue multiple file transfer requests with respect to one transfer request handled by the request handling unit 136. By means of this, it becomes possible to transfer multiple files including the requested file and its related files from the file server 110 to the file requesting client 120 at once, by a single file transfer request operation by the user. In this case, only the file specified by the file transfer request operation by the user is displayed on a screen, while the other related files are stored in the cache region 121*a* together with the file specified by the file transfer request operation.

The acquisition of related file information necessary in issuing the file requests such as locations and file names of the related files can be carried out by either one of the following two methods.

(Method 1) A file list is produced by extracting an information on links to the related files which are included in the file of the HTML format transferred from the file server 110 to the file requesting client 120. Then, the file is taken out from the file list one by one and the file request for each related file is issued sequentially.

(Method 2) A file list for each file is produced in advance at the file server 110 side, and the file list corresponding to the file specified by the file transfer request from the file requesting client 120 is transferred from the file server 110 to the file requesting client 120. Then, the file is taken out from the file list one by one and the file request for each related file is issued sequentially.

It is not absolutely necessary to provide in advance the multiple files transfer request unit 138 for carrying out the procedure to sequentially transmit the multiple file transfer requests in this manner on the file requesting client 120 side, and it is also possible to transfer the similar program from the file server 110 to the file requesting client 120 along with the file list for the related files.

It is also possible to use (Method 3) in which the transfer of the multiple files is realized by concatenating the multiple related files in advance at the file server 110 side and transferring this concatenated file from the file server 110 in response to the file transfer request from the file requesting client 120. In this method 3, the multiple files transfer request unit 138 of FIG. 23 will be unnecessary.

Next, with reference to the flow chart of FIG. 24, the first concrete example of the operation procedure for the file display program 130 will be described.

First, the user or program requests the transfer and the display of the file by issuing the file transfer request (step S11). For this purpose, it suffices to use the URL which is an identifier for uniquely identifying the file. For example, when the URL is specified as "http://isl.rdc.tochina.co.jp/index.html", it is possible to uniquely identify the file for which the transfer protocol is the HTTP, the server (connection destination file server name) is "isl.rdc.toshiba.co.jp", and the file name is "index.html". In the following, it is assumed that the requested file is a file-A which is a file identified by such an identifier A.

Then, the request handling unit 136 handles this display request (step S12), and the file request unit 132 transmits the file transfer request for the file-A in the HTTP format to the file server program 150 (step S13). The file server program 150 transfers the file-A specified by the file transfer request from the file request unit 132 to the file requesting client 120. In this case, if the file list corresponding to the file-A which is specified by the file transfer request is possessed by the file server 110, this file list is transferred to the file requesting client 120, either alone or together with the file-A. Here, it is assumed that the file list is to be transferred alone.

Consequently, the file received at the file receiving unit 133 can come in two types. Namely, the-file list and the ordinary file (the file-A in this example) which is not the file list. An example of the file list in this case is shown in FIG. 25.

In the file list 2500 of FIG. 25, <LIST> is a keyword indicating that this file is the file list. The following character string indicates an identifier of the file-A which is requested by the user. The second and subsequent lines indicate the identifiers of the related files of this file-A. Here, a file having a name which ends with ".html" is a file in the HTML format, a file having a name which ends with ".gif" is a static image file, and a file having a name which ends with ".au" is an audio file.

The file receiving unit 133 Judges whether the received file is the file list or not according to the keyword of the received file (step S14). If it is not the file list, it is the ordinary file-A, so that this file is displayed by the file display unit 135, while this file is stored into the cache region 121*a* by the file storing unit 134 (step S15). Then, the file list is composed using the identifiers of the related files extracted from this file-A (step S1). After that, at the steps S17 to S21, the multiple files request transmission processing to take out the identifier of the file from the produced file list one by one and sequentially issue the file request for each related file is started. Even in a case where the file received by the file receiving unit 133 is the file list, the multiple files request transmission processing is similarly carried out at the steps S17 to S21 by using the received file list.

In this multiple files request transmission processing, first, the multiple files transfer request unit 138 judges whether the transfer interrupt condition holds or not (step S17). The transfer interrupt condition is for limiting an amount of utilization of the storage medium 121 of the file requesting client 120 or the communication time through the network. It is preferable to judge that the transfer interrupt condition holds when a total data size of the files transferred from the file server 110 exceeds a prescribed value, or when the file transfer time exceeds a prescribed value, or else when an explicit transfer interrupt request is received from the user or program.

To be more specific, when it is desired to receive only data up to an amount less than or equal to a particular value, a data amount of the received data can be measured at the file receiving unit 133, and the transfer can be interrupted when the measured data amount reaches the particular value. On the other hand, when it is desired to maintain a size of a vacant region in the storage medium 121 at a particular value, the upper limit of a data size that can be received can be determined from a current vacant capacity for example, and the transfer can be interrupted when the data amount received at the file receiving unit 133 reaches to that upper limit. Alternatively, in a case of judging that the transfer interrupt condition holds when a particular time has elapsed since the file transfer is requested, a timer can be set up to issue an interrupt when a particular time has elapsed since the transfer request is transmitted, and the transfer can be interrupted when the interrupt is received. It is also possible to detect the received data amount by using the data size information attached to the file transferred from the file server 110.

When the transfer interrupt condition does not hold, the multiple files transfer request unit 138 selects one not yet transferred file from the files listed in the file list, and gives its identifier to the file request unit 132 to command the issuance of the file transfer request (step S18). When the transfer target file is selected in this manner (step S19 YES), the file request unit 132 transmits the file transfer request for the specified file in the HTTP format to the file server program 150 (step S20). The file server program 150 then transfers the file specified by the file transfer request from the file request unit 132 to the file requesting client 120. This file is received by the file receiving unit 133, and stored into the cache region 121a by the file storing unit 134 (step S21). In a case where the file received at the step S13 is the file list, the file received first at the step S21 is going to be the file-A, and in such a case, the screen display of the file-A is also carried out by the file display unit 135.

The processing of the steps S17 to S21 is repeatedly executed until there is no more not yet transferred file among the files listed in the file list, and every time one file transfer is carried out, whether the transfer interrupt condition holds or not is judged. In a case where the transfer interrupt condition holds (step S17 YES), the multiple files request transmission processing is finished, and the transmission of all the file transfer requests corresponding to the remaining not yet transferred files is interrupted.

Figure 24:
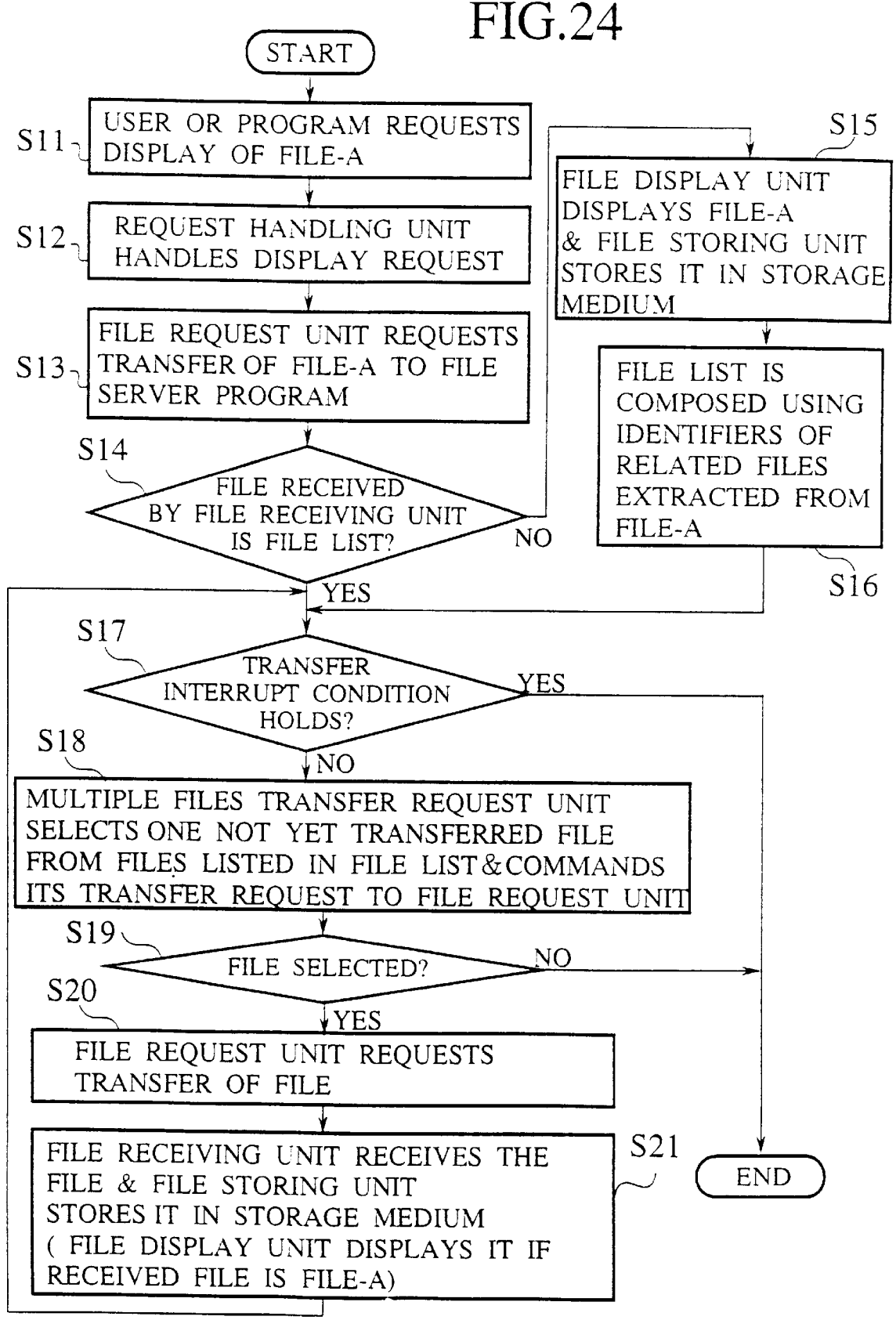
FIG. 24 is a flow chart for the first concrete example of an operation procedure for a file display program in the third embodiment of the present invention.

In this manner, according to the file transfer method in the procedure of FIG. 24, the transfer processing for the multiple files is interrupted at a point where the transfer interrupt condition comes to hold. Consequently, it becomes possible to efficiently limit the transfer of multiple files, and in particular, it is possible to realize the file transfer which is suitable for a system using the file requesting client 120 in a form of a portable information terminal which is not necessarily used under the environment where the network connection is always possible.

Next, with reference to the flow chart of FIG. 26, the second concrete example of the operation procedure for the file display program 130 will be described. This operation procedure is for a case in which the multiple files transfer request unit 138 is not provided in the file requesting client 120 from the beginning and its program is to be transferred from the file server 110 to the file requesting client 120.

First, the user or program requests the transfer and the display of the file by issuing the file transfer request (step S31). For this purpose, it suffices to use the URL as described above which is an identifier for uniquely identifying the file. For example, when the URL is specified as "http://isl.rdc.tochina.co.jp/index.html", it is possible to uniquely identify the file for which the transfer protocol is the HTTP, the server (connection destination file server name) is "isl.rdc.toshiba.co.jp", and the file name is "index.html". In the following, it is assumed that the requested file is a file-A which is a file identified by such an identifier A.

Then, the request handling unit 136 handles this display request (step S32), and the file request unit 132 transmits the file transfer request for the file-A in the HTTP format to the file server program 150 (step S33). The file server program 150 transfers the file-A specified by the file transfer request from the file request unit 132 to the file requesting client 120. In this case, if the file list corresponding to the file-A which is specified by the file transfer request is possessed by the file server 110, this file list is transferred to the file requesting client 120, either alone or together with the file-A. Also, when the file-A is a file which has the multiple files transfer program for realizing a function to transfer the multiple files, this file-A is transferred to the file requesting client 120.

Consequently, the file received at the file receiving unit 133 can come in three types. Namely, the file which has the multiple files transfer program for realizing a function to transfer the multiple files, the file list, and the ordinary file. An example of the file which has the multiple files transfer program in this case is shown in FIG. 27. In this file 1900 of FIG. 27, a program name 1901 and a file list name 1902 are described at a portion 1910. This program is for carrying out a procedure to sequentially request the transfer of the file to the file server 110 by reading out the file list, which is contained in the file 1900 together with the file-A.

The file receiving unit 133 judges a type of the received file (steps S34 and S35). If it is the file list, there is no multiple files transfer function in the file requesting client 120, so that a display of an error message is made and the operation is terminated (step S36). If it is the ordinary file (file-A), the multiple files transfer request processing is not carried out, and the received file-A is displayed by the file display unit 135 while the received file-A is stored into the cache region 121a by the file storing unit 134 and the operation is terminated (step S37).

If it is the file-A which contains the multiple files transfer program, the control is shifted to that multiple files transfer program, and the following processing is carried out.

Namely, the multiple files transfer program first displays the file-A while storing the file-A into the cache region 121a, and transmits the file transfer request for requesting the file list specified by the file list name 1902 to the file server 110 by using the file request unit 132 (step S38). By means of this, the file is transferred from the file server 110, and received at the file receiving unit 133. If the file received at the file receiving unit 133 is not the file list, it is judged as an error (steps S39 and S36). If it is the file list, the multiple files request transmission processing of the steps S40 to S44 using the received file list is started under the control of the multiple files transfer program.

In this multiple files request transmission processing, first, the multiple files transfer program judges whether the transfer interrupt condition holds or not (step S40). The transfer interrupt condition is for limiting an amount of utilization of the storage medium 121 of the file requesting client 120 or the communication time through the network. It is judged that the transfer interrupt condition holds when a total data size of the files transferred from the file server 110 exceeds a prescribed value, or when the file transfer time exceeds a prescribed value, or else when an explicit transfer interrupt request is received from the user or program.

To be more specific, when it is desired to receive only data up to an amount less than or equal to a particular value, a data amount of the received data can be measured at the file receiving unit 133, and the transfer can be interrupted when the measured data amount reaches the particular value. On the other hand, when it is desired to maintain a size of a vacant region in the storage medium 121 at a particular value, the upper limit of a data size that can be received can be determined from a current vacant capacity for example, and the transfer can be interrupted when the data amount received at the file, receiving unit 133 reaches to that upper limit. Alternatively, in a case of judging that the transfer interrupt condition holds when a particular time has elapsed since the file transfer is requested, a timer can be set up to issue an interrupt when a particular time has elapsed since the transfer request is transmitted, and the transfer can be interrupted when the interrupt is received.

When the transfer interrupt condition does not hold, the multiple files transfer program selects one not yet transferred file from the files listed in the file list, and gives its identifier to the file request unit 132 to command the issuance of the file transfer request (step S41). When the transfer target file is selected in this manner (step S42 YES), the file request unit 132 transmits the file transfer request for the specified file in the HTTP format to the file server program 150 (step S43). The file server program 150 then transfers the file specified by the file transfer request from the file request unit 132 to the file requesting client 120. This file is received by the file receiving unit 133, and stored into the cache region 121*a* by the file storing unit 134 (step S44).

The processing of the steps S40 to S44 is repeatedly executed until there is no more not yet transferred file among the files listed in the file list, and every time one file transfer is carried out, whether the transfer interrupt condition holds or not is judged. In a case where the transfer interrupt condition holds (step S40 YES), the multiple files request transmission processing is finished, and the transmission of all the file transfer requests corresponding to the remaining not yet transferred files is interrupted.

Figure 26:
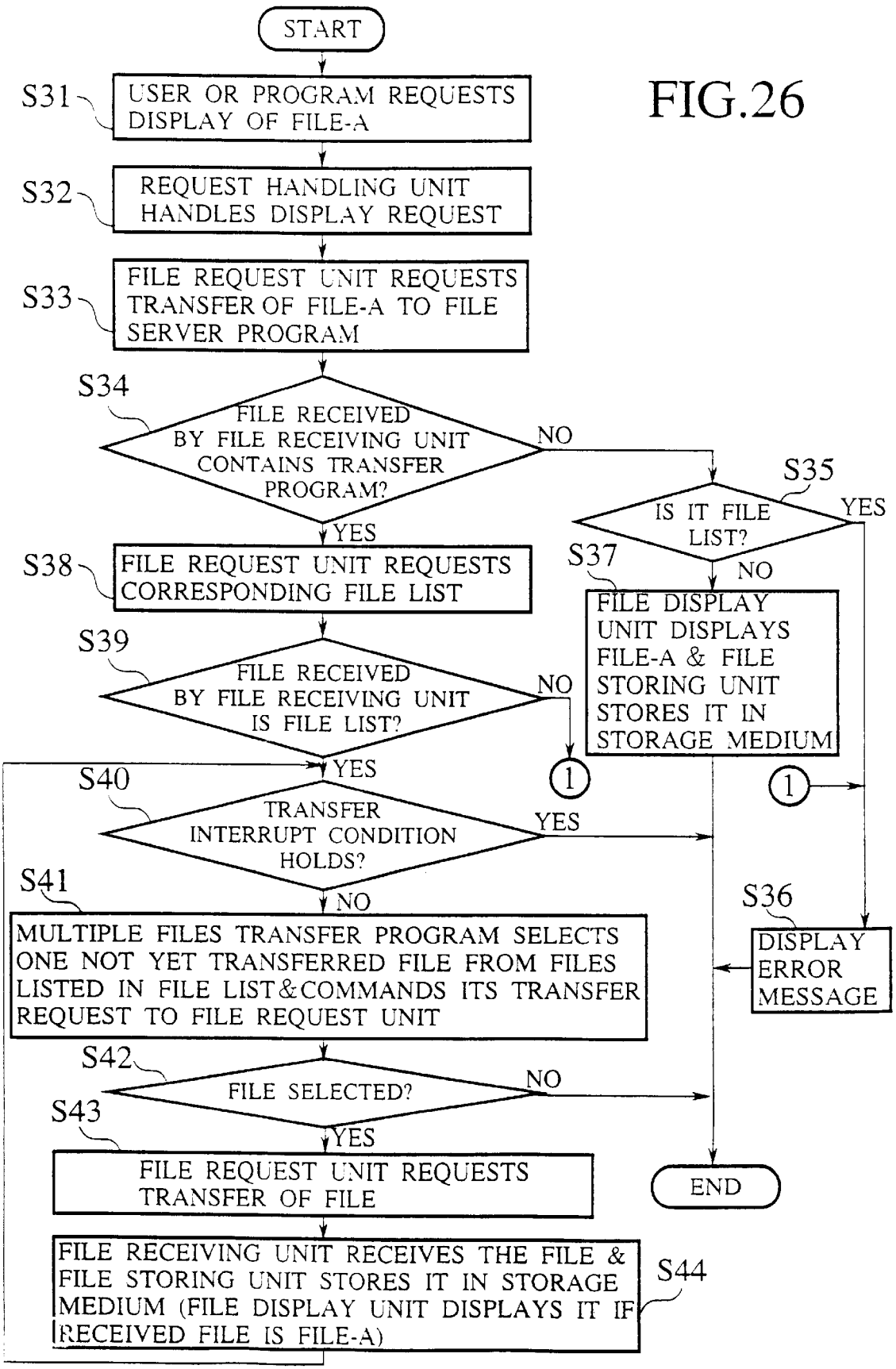
FIG. 26 is a flow chart for the second concrete example of an operation procedure for a file display program in the third embodiment of the present invention.

In this manner, according to the file transfer method in the procedure of FIG. 26, the procedure for transferring the related files of the file-A is automatically carried out by the multiple files transfer program which is transferred from the file server 110 together with the file-A, and the transfer processing for the multiple files is interrupted at a point where the transfer interrupt condition comes to hold. Consequently, it becomes possible to carry out the transfer of multiple files and the control for limiting that transfer, without providing a special function at the file requesting client 120 in advance.

Next, with reference to the flow chart of FIG. 28, the third concrete example of the operation procedure for the file display program 130 will be described. In this operation procedure, the file transfer is limited according to a type of the file (a data type by which the file is expressed) and the display and execution capability of the file requesting client 120.

First, the user or program requests the transfer and the display of the file by issuing the file transfer request (step S51). For this purpose, it suffices to use the URL as described above which is an identifier for uniquely identifying the file. For example, when the URL is specified as "http://isl.rdc.tochina.co.jp/index.html", it is possible to uniquely identify the file for which the transfer protocol is the HTTP, the server (connection destination file server name) is "isl.rdc.toshiba.co.jp", and the file name is "index.html". In the following, it is assumed that the requested file is a file-A which is a file identified by such an identifier A.

Then, the request handling unit 136 handles this display request (step S52), and the file request unit 132 transmits the file transfer request for the file-A in the HTTP format to the file server program 150 (step S53). The file server program 150 transfers the file-A specified by the file transfer request from the file request unit 132 to the file requesting client 120. In this case, if the file list corresponding to the file-A which is specified by the file transfer request is possessed by the file server 110, this file list is transferred to the file requesting client 120, either alone or together with the file-A. Here, it is assumed that the file list is to be transferred alone.

Consequently, the file received at the file receiving unit 133 can come in two types. Namely, the file list and the ordinary file (the file-A in this example) which is not the file list. An example of the file list in this case is the same as that shown in FIG. 25.

The file receiving unit 133 judges whether the received file is the file list or not according to the keyword of the received file (step S54). If it is not the file list, it is the ordinary file-A, so that this file is displayed by the file display unit 135, while this file is stored into the cache region 121*a* by the file storing unit 134 (step S55). Then, the file list is composed using the identifiers of the related files extracted from this file-A (step S56). After that, at the steps S57 to S61, the multiple files request transmission processing to take out the identifier of the file from the produced file list one by one and sequentially issue the file request for each related file is started. Even in a case where the file received by the file receiving unit 133 is the file list, the multiple files request transmission processing is similarly carried out at the steps S57 to S61 by using the received file list.

In this multiple files request transmission processing, first, the multiple files transfer request unit 138 selects one not yet selected file from the files listed in the file list as a file transfer request target (step S57). When the file transfer request target file is selected (step S58 YES), the multiple files transfer request unit 138 judges whether a type of the selected file matches with the transfer condition or not (step S59). The transfer condition is for preventing a wasteful transfer of a file of a type which cannot be utilized at the file requesting client 120, in consideration to the display and execution capability of the file requesting client 120, and determined in advance according to types of files such as static image files, video image files, audio files, etc., and the display and execution capability of the file requesting client 120.

For example, in a case of using a display which cannot display the video image, the video image file does not satisfy the transfer condition. In a case of using the file requesting client 120 which does not have a function for executing the audio data, the audio file does not satisfy the transfer condition.

When a type of the selected file does not satisfy the transfer condition, the steps S57 to S59 are executed again, to make the selection of another file and the judgement as to whether that another file satisfies the transfer condition or not.

When a type of the selected file satisfies the transfer condition, the file request unit 132 transmits the file transfer request for the specified file in the HTTP format to the file server program 150 (step S60). The file server program 150 then transfers the file specified by the file transfer request from the file request unit 132 to the file requesting client 120. This file is received by the file receiving unit 133, and stored into the cache region 121a by the file storing unit 134 (step S61). In a case where the file received at the step S61 is the file list, the file received first at the step S61 can be the file-A, and in such a case, the screen display of the file-A is also carried out by the file display unit 135.

The processing of the steps S57 to S61 is repeatedly executed until there is no more not yet selected file among the files listed in the file list, and every time one file selection is made, whether the transfer condition holds or not is judged.

Figure 28:
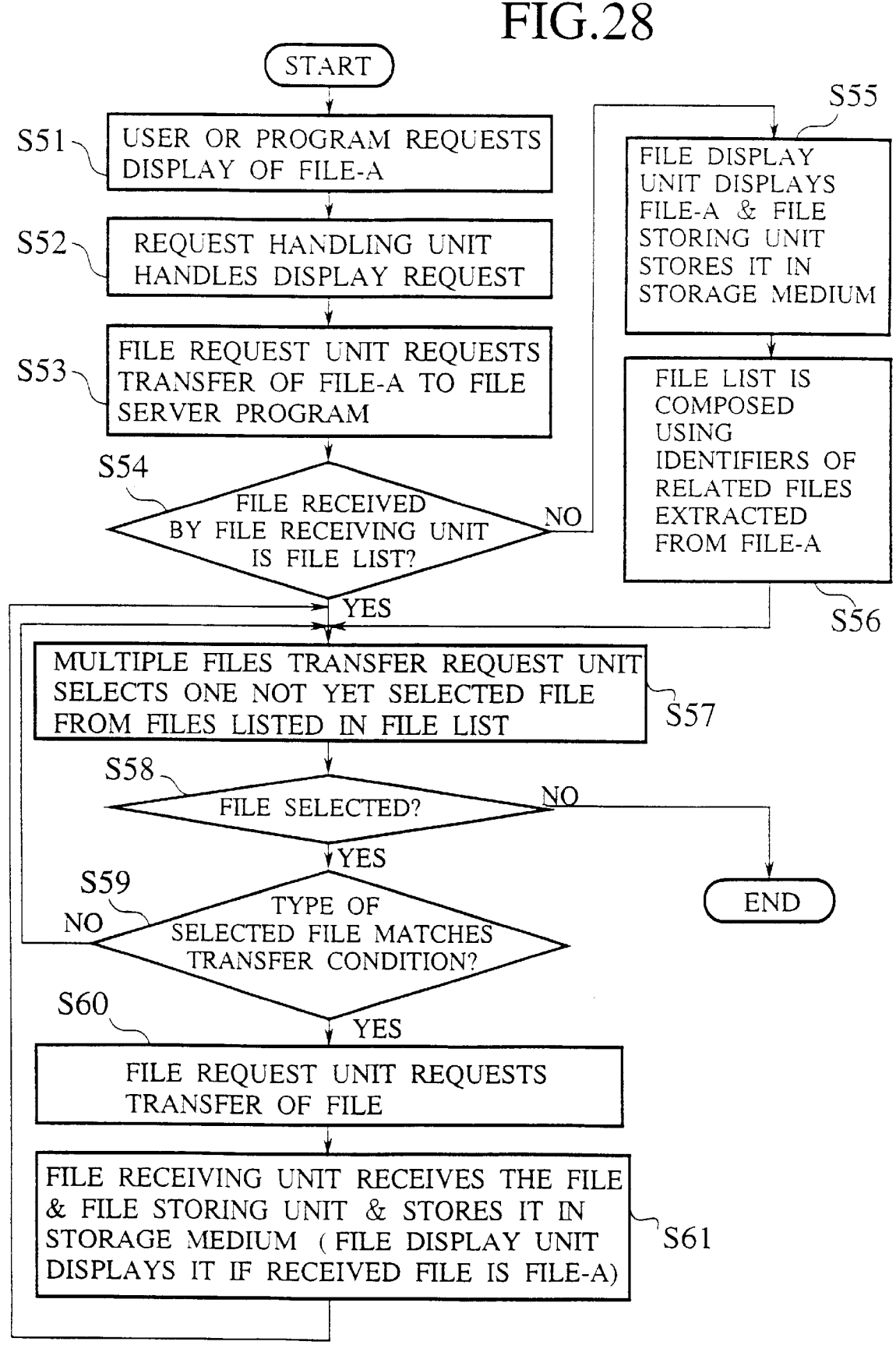
FIG. 28 is a flow chart for the third concrete example of an operation procedure for a file display program in the third embodiment of the present invention.

In this manner, according to the file transfer method in the procedure of FIG. 28, it is possible to transfer only those files which are selected according to the file type and the display and execution capability of the file requesting client 120 from the file server 110 to the file requesting client 120, so that it becomes possible to prevent the waste of the storage medium 121 due to the transfer of files that cannot be utilized at the file requesting client 120 and the meaningless increase of traffic in a network.

Next, with reference to the flow chart of FIG. 29, the fourth concrete example of the operation procedure for the file display program 130 will be described. The third example described above is for a case in which the multiple files transfer request unit 138 for transferring only those files which match with the transfer condition is provided in the file requesting client 120 in advance, but this operation procedure is for a case in which the multiple files transfer request unit 138 is not provided in the file requesting client 120 from the beginning and its program is to be transferred from the file server 110 to the file requesting client 120.

First, the user or program requests the transfer and the display of the file by issuing the file transfer request (step S71). For this purpose, it suffices to use the URL as described above which is an identifier for uniquely identifying the file. For example, when the URL is specified as "http://isl.rdc.tochina.co.jp/index.html", it is possible to uniquely identify the file for which the transfer protocol is the HTTP, the server (connection destination file server name) is "isl.rdc.toshiba.co.jp", and the file name is "index.html". In the following, it is assumed that the requested file is a file-A which is a file identified by such an identifier A.

Then, the request handling unit 136 handles this display request (step S72), and the file request unit 132 transmits the file transfer request for the file-A in the HTTP format to the file server program 150 (step S73). The file server program 150 transfers the file-A specified by the file transfer request from the file request unit 132 to the file requesting client 120. In this case, if the file list corresponding to the file-A which is specified by the file transfer request is possessed by the file server 110, this file list is transferred to the file requesting client 120, either alone or together with the file-A. Also, when the file-A is a file which has the multiple files transfer program for realizing a function to transfer the multiple files, this file-A is transferred to the file requesting client 120.

Consequently, the file received at the file receiving unit 133 can come in three types. Namely, the file which has the multiple files transfer program for realizing a function to transfer the multiple files, the file list, and the ordinary file. An example of the file which has the multiple files transfer program in this case is the same as that shown in FIG. 27.

The file receiving unit 133 judges a type of the received file (steps S74 and S75). If it is the file list, there is no multiple files transfer function in the file requesting client 120, so that a display of an error message is made and the operation is terminated (step S76). If it is the ordinary file (file-A), the multiple files transfer request processing is not carried out, and the received file-A is displayed by the file display unit 135 while the received file-A is stored into the cache region 121a by the file storing unit 134 and the operation is terminated (step S77).

If it is the file-A which contains the multiple files transfer program, the control is shifted to that multiple files transfer program, and the following processing is carried out.

Namely, the multiple files transfer program first displays the file-A while storing the file-A into the cache region 121a, and transmits the file transfer request for requesting the file list specified by the file list name 1902 to the file server 110 by using the file request unit 132 (step S78). By means of this, the file is transferred from the file server 110, and received at the file receiving unit 133. If the file received at the file receiving unit 133 is not the file list, it is judged as an error (steps S79 and S76). If it is the file list, the multiple files request transmission processing of the steps S80 to S84 using the received file list is started under the control of the multiple files transfer program.

In this multiple files request transmission processing, first, the multiple files transfer program selects one not yet selected file from the files listed in the file list as a file transfer request target (step S80). When the file transfer request target file is selected (step S81 YES), the multiple files transfer program judges whether a type of the selected file matches with the transfer condition or not (step S82). The transfer condition is for preventing a wasteful transfer of a file of a type which cannot be utilized at the file requesting client 120, in consideration to the display and execution capability of the file requesting client 120, and determined in advance according to types of files such as static image files, video image files, audio files, etc., and the display and execution capability of the file requesting client 120.

When a type of the selected file does not satisfy the transfer condition, the steps S80 to S82 are executed again, to make the selection of another file and the judgement as to whether that another file satisfies the transfer condition or not.

When a type of the selected file satisfies the transfer condition, the multiple files transfer program transmits the file transfer request for that file in the HTTP format to the file server program 150 by using the file request unit 132 (step S83). The file server program 150 then transfers the file specified by the file transfer request from the file request unit 132 to the file requesting client 120. This file is received by the file receiving unit 133, and stored into the cache region 121a by the file storing unit 134 (step S84).

The processing of the steps S80 to S84 is repeatedly executed until there is no more not yet selected file among the files listed in the file list, and every time one file selection is made, whether the transfer condition holds or not is judged.

Figure 29:
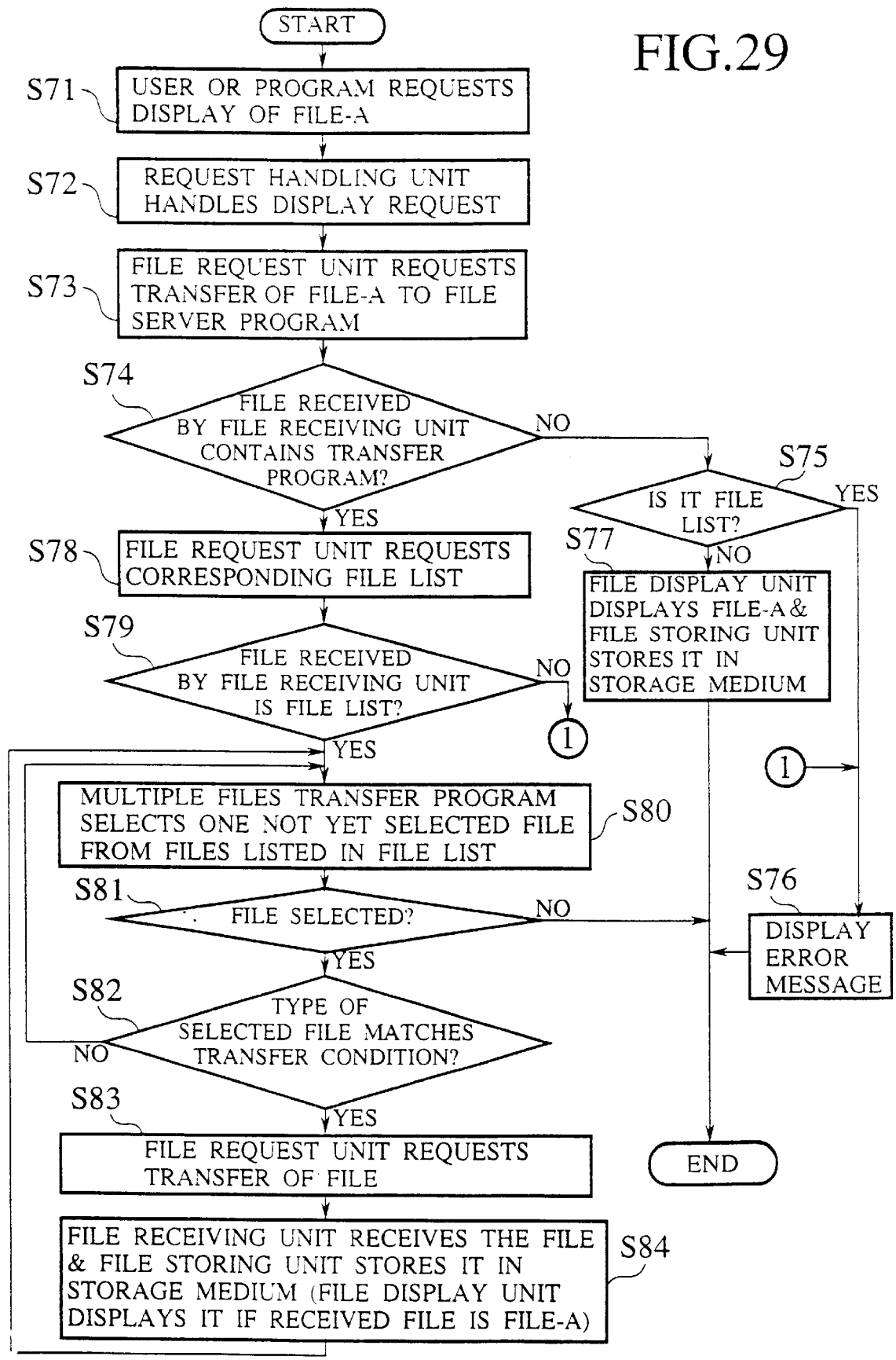
FIG. 29 is a flow chart for the fourth concrete example of an operation procedure for a file display program in the third embodiment of the present invention.

In this manner, according to the file transfer method in the procedure of FIG. 29, it is possible to transfer only the selected files from the file server 110 to the file requesting client 120, by determining in advance the transfer condition according to the file type and the display and execution capability of the file requesting client 120, so that it becomes possible to prevent the waste of the storage medium 121 due to the transfer of files that cannot be utilized at the file requesting client 120 and the meaningless increase of traffic in a network.

Referring now to FIG. 30 to FIG. 33, the fourth embodiment of a file transfer method, a file server device, and a file requesting client device according to the present invention will be described in detail.

This fourth embodiment is directed to a modification of the third embodiment described above, which stores concatenated files each of which is formed from multiple files, or compressed concatenated files, in the storage medium 156 of the file server 110, instead of the file lists 112, or the files 111 and the file lists 112 used in the third embodiment.

Figure 30:
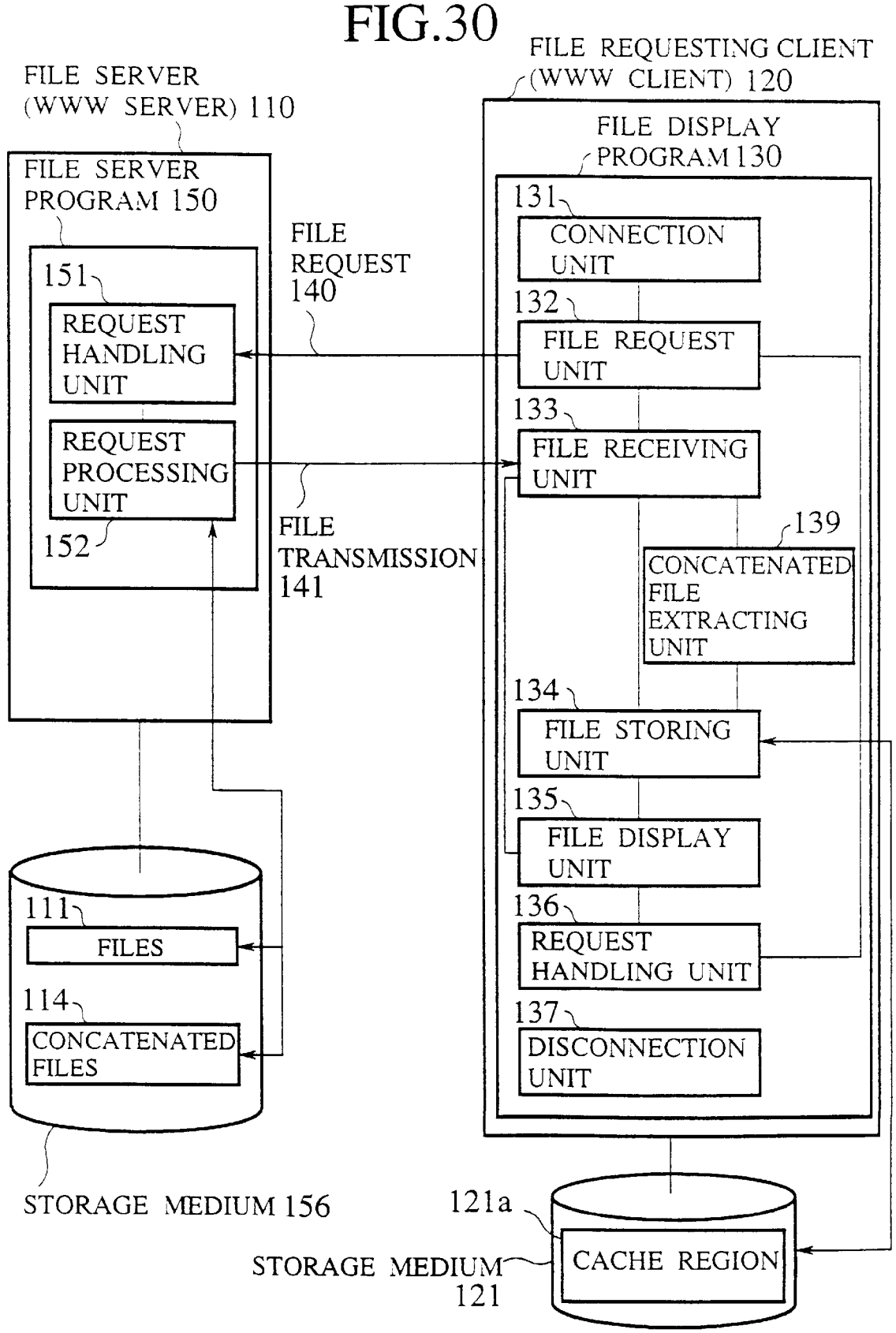
FIG. 30 is a block diagram of an information communication system for realizing the file transfer method according to the fourth embodiment of the present invention.

FIG. 30 shows a configuration of an information communication system in this fourth embodiment and functional configurations of programs used in this system, in which the multiple related files are concatenated in advance in the file server 110 and this concatenated file is transferred from the file server 110 in response to the file transfer request from the file requesting client 120, rather than sequentially issuing the multiple file transfer requests.

In the system of FIG. 30, on the file server 110, a file server program 150 is operating. This file server program 150 comprises a request handling unit 151 and a request processing unit 152, while the storage medium 156 stores the files 111 and the concatenated files 114. The request handling unit 151 is a program for handling a request from a file display program 130 operating on the file requesting client 120. The request processing unit 152 is a program for carrying out actual processing according to the requests handled by the request handling unit 151. For example, when the request handling unit 151 handles the file transfer request 140, the corresponding file 111 or concatenated file 114 is retrieved from the storage medium 156, and when this file is found, the file transfer 141 is carried out.

On the file requesting client 120, the file display program 130 is operating. This file display program 130 has a concatenated file extracting unit 139 instead of the multiple files transfer request unit 138 of FIG. 23. This concatenated file extracting unit 139 is a program for extracting individual files from the concatenated file received by the file receiving unit 133. The rest of the file display program 130 is substantially the same as that of FIG. 23.

Next, with reference to the flow chart of FIG. 31, the first concrete example of the operation procedure for the file display program 130 in the system of FIG. 30 will be described.

First, the user or program requests the transfer and the display of the file by issuing the file transfer request (step S91). For this purpose, it suffices to use the URL as described above which is an identifier for uniquely identifying the file. For example, when the URL is specified as "http://isl.rdc.tochina.co.jp/index.html", it is possible to uniquely identify the file for which the transfer protocol is the HTTP, the server (connection destination file server name) is "isl.rdc.toshiba.co.jp", and the file name is "index.html". In the following, it is assumed that the requested file is a file-A which is a file identified by such an identifier A.

Then, the request handling unit 136 handles this display request (step S92), and the file request unit 132 transmits the file transfer request for the file-A in the HTTP format to the file server program 150 (step S93). The file server program 150 transfers the file-A specified by the file transfer request from the file request unit 132 to the file requesting client 120. In this case, if the concatenated file corresponding to the file-A which is specified by the file transfer request is possessed by the file server 110, this concatenated file is transferred to the file requesting client 120.

Consequently, the file received at the file receiving unit 133 can come in two types. Namely, the concatenated file formed by concatenating multiple files and the ordinary file (the file-A in this example). In this example, the concatenated file is to be formed by concatenating multiple compressed files where each compressed file is obtained by compressing each file separately. An example of the concatenated file in this case is shown in FIG. 32.

In the concatenation file 3200 of FIG. 32, <CONCATENATE> is a header indicating that this file is the concatenated file. Separately compressed files are concatenated with the file-A specified by the file request at a top. Each file is given by an identifier for uniquely identifying this file, a file size after compression, and the compressed file itself.

The file receiving unit 133 judges whether the received file is the concatenated file or not (step S94). If it is the ordinary file-A, this file-A is displayed by the file display unit 135, while this file-A is stored into the cache region 121a by the file storing unit 134 and the operation is terminated (step S95). If it is the concatenated file, the processing for receiving that concatenated file is continued by the file receiving unit 133 (step S96).

While the concatenated file is transferred from the file server 110 to the file requesting client 120 (step S96b NO), the file display program 130 judges whether the transfer interrupt condition holds or not (step S97). The transfer interrupt condition is for limiting an amount of utilization of the storage medium 121 of the file requesting client 120 or the communication time through the network. It is preferable to judge that the transfer interrupt condition holds when a total data size of the files transferred from the file server 110 exceeds a prescribed value, or when the file transfer time exceeds a prescribed value, or else when an explicit transfer interrupt request is received from the user or program.

To be more specific, when it is desired to receive only data up to an amount less than or equal to a particular value, a data amount of the received data can be measured at the file receiving unit 133, and the transfer can be interrupted when the measured data amount reaches the particular value. On the other hand, when it is desired to maintain a size of a vacant region in the storage medium 121 at a particular value, the upper limit of a data size that can be received can be determined from a current vacant capacity for example, and the transfer can be interrupted when the data amount received at the file receiving unit 133 reaches to that upper limit. Alternatively, in a case of judging that the transfer interrupt condition holds when a particular time has elapsed since the file transfer is requested, a timer can be set up to issue an interrupt when a particular time has elapsed since the transfer request is transmitted, and the transfer can be interrupted when the interrupt is received. It is also possible to detect the received data amount by using the data size information for each compressed file contained in the concatenated file.

When the transfer interrupt condition holds (step S97 YES), the receiving processing is interrupted at that point, and the concatenated file extracting unit 139 extracts each individual file from a portion of the concatenated file which is successfully transferred, and each extracted individual file is stored into the cache region 121a by the file storing unit 134 (step S98). On the other hand, when the transfer of the entire concatenated file is completed while the transfer interrupt condition did not hold during the transfer of this concatenated file (step S96b YES), the concatenated file extracting unit 139 extracts each individual file from the entire concatenated file to recover all the files constituting this concatenated file, and each extracted individual file is stored into the cache region 121a by the file storing unit 134 (step S99).

Figure 31:
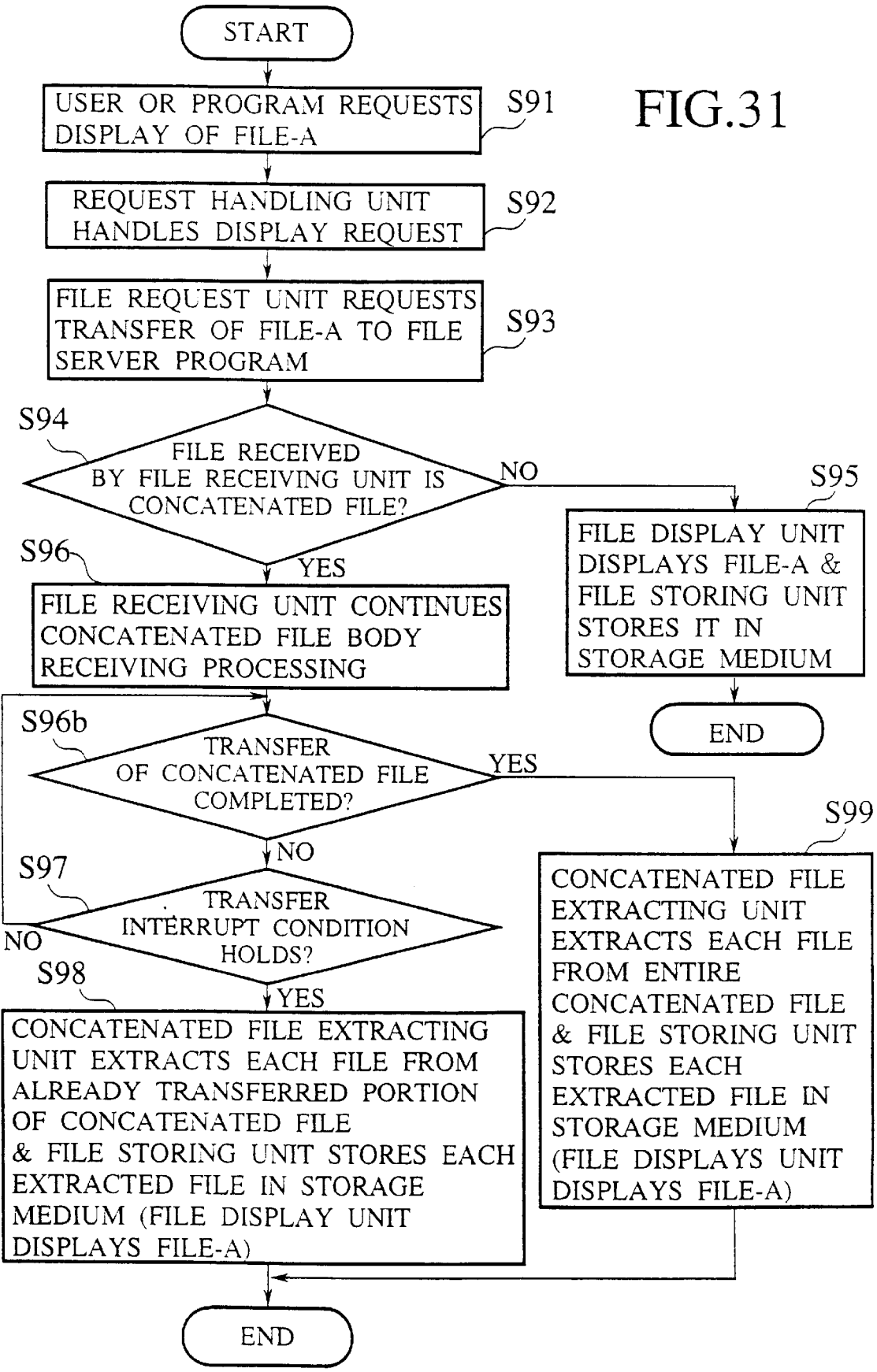
FIG. 31 is a flow chart for the first concrete example of an operation procedure for a file display program in the fourth embodiment of the present invention.

According to the file transfer method in the procedure of FIG. 31, when the transfer is interrupted in a middle of transferring the file having the URL "http://isl.rdc.toshiba.co.jp/newspaper/image/image1.gif" in the concatenated file shown in FIG. 32, for example, it is possible for the file requesting client 120 to recover and utilize the files up to a file that immediately precedes the interrupted one, that is, the file having the URL "http://isl.rdc.toshiba.co.jp/newspaper/article2.html".

Figure 33:
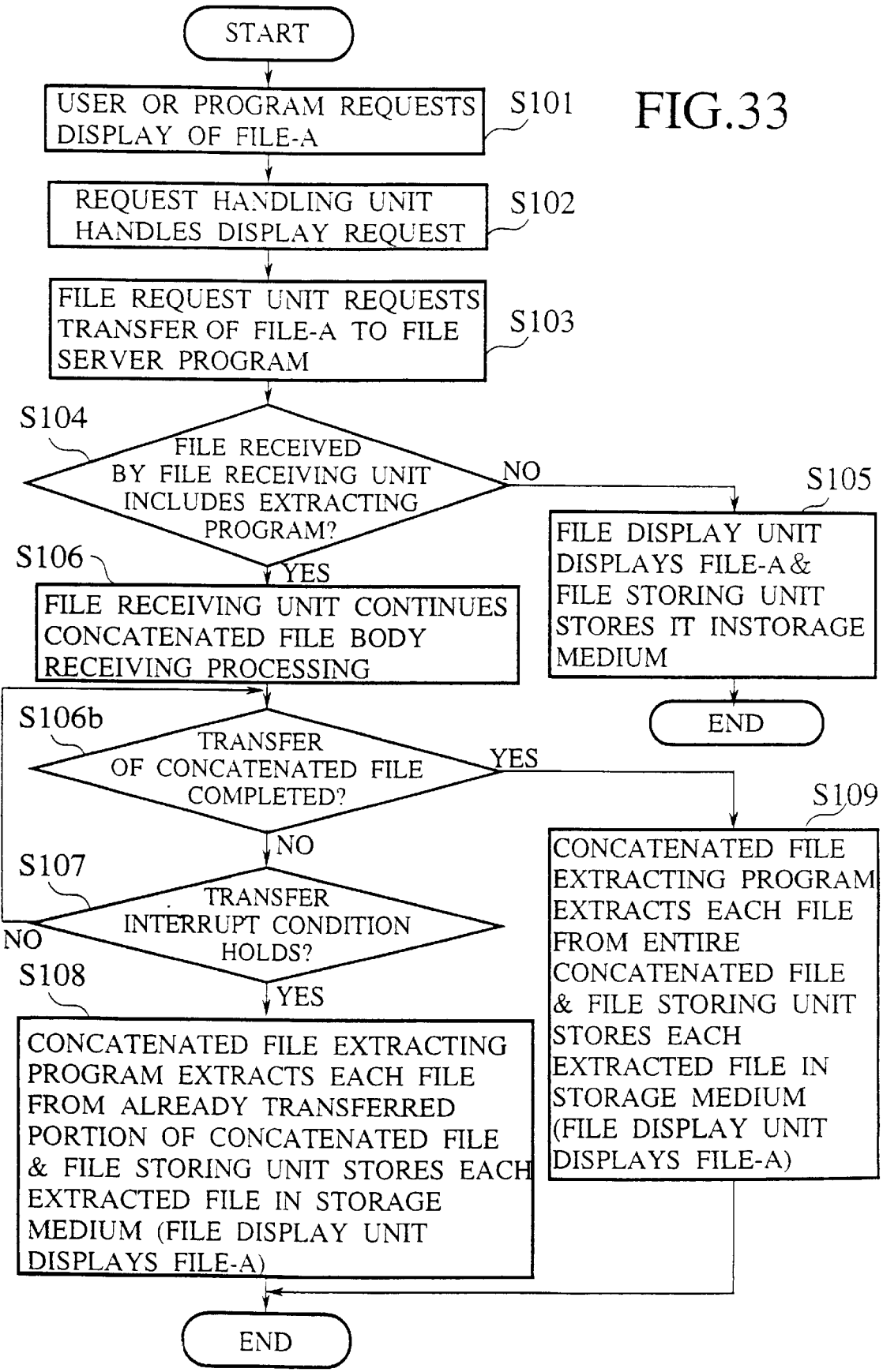
FIG. 33 is a flow chart for the second concrete example of an operation procedure for a file display program in the fourth embodiment of the present invention.

Next, with reference to the flow chart of FIG. 33, the second concrete example of the operation procedure for the file display program 130 in the system of FIG. 30 will be described. This operation procedure is for a case in which the concatenated file extracting unit 139 is not provided in the file requesting client 120 from the beginning and its program is to be transferred from the file server 110 to the file requesting client 120.

First, the user or program requests the transfer and the display of the file by issuing the file transfer request (step S101). For this purpose, it suffices to use the URL as described above which is an identifier for uniquely identifying the file. For example, when the URL is specified as "http://isl.rdc.tochina.co.jp/index.html", it is possible to uniquely identify the file for which the transfer protocol is the HTTP, the server (connection destination file server name) is "isl.rdc.toshiba.co.jp", and the file name is "index.html". In the following, it is assumed that the requested file is a file-A which is a file identified by such an identifier A.

Then, the request handling unit 136 handles this display request (step S102), and the file request unit 132 transmits the file transfer request for the file-A in the HTTP format to the file server program 150 (step S103). The file server program 150 transfers the file-A specified by the file transfer request from the file request unit 132 to the file requesting client 120. In this case, if the concatenated file corresponding to the file-A which is specified by the file transfer request is possessed by the file server 110 and this concatenated file contains the concatenated file extracting program, this concatenated file containing the concatenated file extracting program is transferred to the file requesting client 120.

Consequently, the file received at the file receiving unit 133 can come in two types. Namely, the concatenated file containing the concatenated file extracting program and the ordinary file (the file-A in this example). In this example, the concatenated file is to be formed by concatenating multiple compressed files where each compressed file is obtained by compressing each file separately, just as described above in relation to FIG. 32. In this concatenated file, the concatenated file extracting program is contained by the similar format as that described above in relation to FIG. 27 (except that the file list is not contained in this case).

The file receiving unit 133 judges whether the received file is the concatenated file which includes the concatenated file extracting program or not (step S104). If it is the ordinary file-A, this file-A is displayed by the file display unit 135, while this file-A is stored into the cache region 121a by the file storing unit 134 and the operation is terminated (step S105). If it is the concatenated file which includes the concatenated file extracting program, the processing for receiving that concatenated file is continued by the file receiving unit 133 (step S106).

While the concatenated file is transferred from the file server 110 to the file requesting client 120 (step S106b NO), the file display program 130 judges whether the transfer interrupt condition holds or not (step S107). The transfer interrupt condition is for limiting an amount of utilization of the storage medium 121 of the file requesting client 120 or the communication time through the network. It is judge that the transfer interrupt condition holds when a total data size of the files transferred from the file server 110 exceeds a prescribed value, or when the file transfer time exceeds a prescribed value, or else when an explicit transfer interrupt request is received from the user or program.

When the transfer interrupt condition holds (step S107 YES), the receiving processing is interrupted at that point, and the concatenated file extracting program extracts each individual file from a portion of the concatenated file which is successfully transferred, and each extracted individual file is stored into the cache region 121a by the file storing unit 134 (step S108). On the other hand, when the transfer of the entire concatenated file is completed while the transfer interrupt condition did not hold during the transfer of this concatenated file (step S106b YES), the concatenated file extracting program extracts each individual file from the entire concatenated file to recover all the files constituting this concatenated file, and each extracted individual file is stored into the cache region 121a by the file storing unit 134 (step S109).

Note that, for the system of FIG. 30, an exemplary case of transferring the concatenated file in which files are compressed file by file has been described, but it is also possible to transfer the concatenated file which is not compressed in such a manner and formed by concatenating multiple files with the file specified by the file transfer request at a top, from the file server 110 to the file requesting client 120.

In such a case, the file-A requested by the user is transferred to the file requesting client 120 first, so that even when the transfer of the concatenated file is interrupted in a middle as the transfer interrupt condition comes to hold, it is highly likely that the transfer of at least the file-A requested by the user is completed by then, so that the file requesting client 120 can utilize at least the file-A requested by the user in most cases.

As described, according to the third and fourth embodiments, in the system for transferring the file from the server to the client and displaying the file at the client, it is possible to interrupt the transfer in a case where the file transfer is not fast or in a case where a vacant region of the storage medium possessed by the client is not large, while it is possible for the client to use those files whose transfer is completed at a time of interruption, both in a case of transferring multiple files and in a case of transferring multiple files concatenated into one file. In addition, it is also possible to transfer only those files which can be utilized at the client according to the file display and execution capability of the client.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each one of the file server program 110 and the file display program 130 of each embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for transferring files from a file server to a file requesting client, comprising the steps of:
   (a) making a request for a desired file specified by a user at the file requesting client, from the file requesting client to the file server;
   (b) transferring a concatenated file for the desired file, the concatenated file being formed by concatenating files related to the desired file and being selected at the file server according to the request, from the file server to the file requesting client; and
   (c) extracting individual files from the concatenated file at the file requesting client.

2. The method of claim 1, wherein the step (b) transfers the concatenated file formed by concatenating hypermedia files which are linked with the desired file.

3. The method of claim 1, further comprising the step of:
   (d) transferring a program capable of extracting the individual files from the concatenated file, from the file server to the file requesting client, wherein the step (c) extracts the individual files by executing said program on the file requesting client.

4. The method of claim 1, further comprising the steps of:
   (e) judging whether a prescribed transfer interrupt condition holds or not for a transfer of the concatenated file at the step (b); and
   (f) interrupting the transfer of the concatenated file at the step (b) when the step (e) judges that the prescribed transfer interrupt condition holds.

5. The method of claim 4, wherein the step (e) judges that the prescribed transfer interrupt condition holds when a total data size transferred by the step (b) exceeds a prescribed value.

6. The method of claim 4, wherein the step (e) judges that the prescribed transfer interrupt condition holds when a transfer time taken by the step (b) exceeds a prescribed value.

7. The method of claim 4, wherein the step (e) judges that the prescribed transfer interrupt condition holds when an interrupt command is issued by a user of the file requesting client.

8. The method of claim 4, wherein the step (b) transfers the concatenated file in such a form that the step (c) can extract the individual files contained in a part of the concatenated file already transferred when the transfer of the concatenated file is interrupted by the step (f).

9. The method of claim 4, wherein the step (b) transfers the concatenated file in which the desired file indicated by the request is contained at a top of the concatenated file.

10. A file server device for providing files according to requests from a client, comprising:
    a storage medium for storing files that can be provided by the file server device, and a concatenated file formed by concatenating files related to each stored file;
    receiving means for receiving a request for a desired file specified by a user at the client, from the client; and
    transmitting means for transmitting to the client the concatenated file corresponding to the desired file, the concatenated file being selected at the file server device according to the request, and a program for extracting individual files from the concatenated file.

11. The file server device of claim 10, wherein the storage medium stores the concatenated file formed by concatenating hypermedia files which are linked with each stored file.

12. The file server device of claim 10, further comprising:
    checking means for checking whether the client has a function for processing the concatenated file, wherein the transmitting means transmits the concatenated file when the checking means judges that the client has the function for processing the concatenated file.

13. A file requesting client device for receiving files provided by a file server, comprising:
    request means for making a request for a desired file specified by a user at the file requesting client device, to the file server;
    receiving means for receiving an information transmitted from the file server in response to the file request; and
    extracting means for extracting individual files from a concatenated file for the desired file, the concatenated file being formed by concatenating files related to the desired file and being selected at the file server according to the request, when the information received by the receiving means is the concatenated file.

14. The file requesting client device of claim 13, wherein the receiving means receives the information which is the concatenated file formed by concatenating hypermedia files which are linked with the desired file.

15. The file requesting client device of claim 13, wherein the extracting means extracts the individual files by executing a program for extracting the individual files from the concatenated file which is transmitted from the file server.

16. The file requesting client device of claim 13, wherein the extracting means extracts the individual files by executing a program for extracting the individual files from the concatenated file which is provided at the file request client device in advance.

17. The file requesting client device of claim 13, further comprising:
    transfer interrupt means for judging whether a prescribed transfer interrupt condition holds or not for a transfer of the concatenated file from the file server, and interrupting the transfer of the concatenated file from the file server when the prescribed transfer interrupt condition holds.

18. The file requesting client device of claim 17, wherein the transfer interrupt means judges that the prescribed transfer interrupt condition holds when a total data size transferred from the file server exceeds a prescribed value.

19. The file requesting client device of claim 17, wherein the transfer interrupt means judges that the prescribed transfer interrupt condition holds when a transfer time taken by the file server exceeds a prescribed value.

20. The file requesting client device of claim 17, wherein the transfer interrupt means judges that the prescribed transfer interrupt condition holds when an interrupt command is issued by a user of the file requesting client device.

21. The file requesting client device of claim 13, wherein the receiving means receives the concatenated file in such a form that the extracting means can extract the individual files contained in a part of the concatenated file already transferred when the transfer of the concatenated file is interrupted by the transfer interrupt means.

22. The file requesting client device of claim 13, wherein the receiving means receives the concatenated file in which the desired file indicated by the request is contained at a top of the concatenated file.

23. A computer usable medium having computer readable program code means embodied therein for causing a computer to function as a file server for providing files according to requests from a client, the computer readable program code means including:

first computer readable program code means for causing said computer to receive a request for a desired file specified by a user at the client, from the client; and second computer readable program code means for causing said computer to transmit to the client a concatenated file for the desired file, the concatenated file being formed by concatenating files related to the desired file and being selected at the file server according to the request, and a program for extracting individual files from the concatenated file.

24. A computer usable medium having computer readable program code means embodied therein for causing a computer to function as a file requesting client for receiving files provided by a file server, the computer readable program code means including:

first computer readable program code means for causing said computer to make a request for a desired file specified by a user at the file requesting client, to the file server;

second computer readable program code means for causing said computer to receive an information transmitted from the file server in response to the file request; and third computer readable program code means for causing said computer to extract individual files from a concatenated file for the desired file, the concatenated file being formed by concatenating files related to the desired file and being selected at the file server according to the request, when the information received by the second computer readable program code means is the concatenated file.

25. A method for providing files, comprising the steps of:

transmitting to a connected file requesting device a menu which indicates files that can be provided including a file which is set in correspondence to a concatenated file formed by concatenating a plurality of related files;

receiving from the connected file requesting device a file request corresponding to a file selected by the connected file requesting device from the menu; and returning to the connected file requesting device, in response to the file request, the concatenated file when the concatenated file is specified by the file request or one file when said one file is specified by the file request.

26. A method for requesting files, comprising the steps of:

receiving a menu which indicates files that can be provided by a connected file providing device;

transmitting to the connected file providing device a file request corresponding to a file selected from the menu;

receiving a concatenated file formed by concatenating a plurality of related files or one file which is specified by the file request and is returned from the connected file providing device in response to the file request; and extracting individual files from the concatenated file when the concatenated file is received.

* * * * *